(12) United States Patent
Gass et al.

(10) Patent No.: US 7,707,920 B2
(45) Date of Patent: May 4, 2010

(54) TABLE SAWS WITH SAFETY SYSTEMS

(75) Inventors: Stephen F. Gass, Wilsonville, OR (US);
J. David Fulmer, Tualatin, OR (US);
David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 992 days.

(21) Appl. No.: 11/026,114

(22) Filed: Dec. 31, 2004

(65) Prior Publication Data

US 2005/0139057 A1 Jun. 30, 2005

Related U.S. Application Data

(60) Provisional application No. 60/533,811, filed on Dec. 31, 2003.

(51) Int. Cl.
*B23D 45/16* (2006.01)
*B26D 1/14* (2006.01)
(52) U.S. Cl. ............... 83/781; 83/62.1; 83/DIG. 1; 83/471.1; 83/471.3; 83/477.1; 83/491
(58) Field of Classification Search ............ 83/581, 83/62.1, 781, DIG. 1, 477.2, 477.1, 473, 83/471.1, 468.3, 485, 489, 698.11, 491, 609, 83/508.2, 102.1, 471.3, 471.2, 860, 58; 451/454, 451/455; 409/134; 144/3.1, 130, 286.5, 144/287
See application file for complete search history.

(56) References Cited

U.S. PATENT DOCUMENTS

| | | | |
|---|---|---|---|
| 146,886 A | 1/1874 | Doane et al. | |
| 162,814 A | 5/1875 | Graves et al. | |
| 261,090 A | 7/1882 | Grill | |
| 264,412 A | 9/1882 | Kuhlmann | |
| 299,480 A | 5/1884 | Kuhlmann et al. | |
| 302,041 A | 7/1884 | Sill | |
| 307,112 A | 10/1884 | Groff | |
| 509,253 A | 11/1893 | Shields | |
| 545,504 A | 9/1895 | Hoover | |
| 869,513 A | 10/1907 | Pfeil | |
| 941,726 A | 11/1909 | Pfalzgraf | |
| 997,720 A | 7/1911 | Troupenat | |
| 1,037,843 A | 9/1912 | Ackley | |

(Continued)

FOREIGN PATENT DOCUMENTS

CH 297525 6/1954

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Ghassem Alie

(57) ABSTRACT

Improved table saws and table saws designed to implement safety systems that detect contact between a person and a dangerous portion of the saw are disclosed. The table saws may include an elevation mechanism, a tilt mechanism, and an adjustment system configured to adjust the parallelism between a tilt axis and a blade. The elevation mechanism may include a vertical slide that includes two shafts, and the adjustment system may include a mechanism to adjust the parallelism of the two shafts.

13 Claims, 20 Drawing Sheets

U.S. PATENT DOCUMENTS

| | | |
|---|---|---|
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,255,886 A | 2/1918 | Jones |
| 1,258,961 A | 3/1918 | Tattersall |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,787,191 A * | 12/1930 | Fisk ........................ 83/486.1 |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | G.T. Baker |
| 2,425,331 A | 8/1947 | Kramer |
| 2,434,174 A | 1/1948 | Morgan |
| 2,452,589 A | 11/1948 | McWhirter et al. |
| 2,466,325 A | 4/1949 | Ocenasek |
| 2,496,613 A | 2/1950 | Wooward |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,722,246 A | 11/1955 | Arnoldy |
| 2,731,049 A | 1/1956 | Akin |
| 2,736,348 A | 2/1956 | Nelson |
| 2,737,213 A | 3/1956 | Richards et al. |
| 2,758,615 A | 8/1956 | Mastriforte |
| 2,785,710 A | 3/1957 | Mowery, Jr |
| 2,786,496 A | 3/1957 | Eschenburg |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,883,486 A | 4/1959 | Mason |
| 2,894,546 A | 7/1959 | Eschenburg |
| 2,913,025 A | 11/1959 | Richards |
| 2,913,581 A | 11/1959 | Simonton et al. |
| 2,945,516 A | 7/1960 | Edgemond, Jr. et al. |
| 2,954,118 A | 9/1960 | Anderson |
| 2,957,166 A | 10/1960 | Gluck |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,035,995 A | 5/1962 | Seeley et al |
| 3,047,116 A | 7/1962 | Stiebel et al. |
| 3,085,602 A | 4/1963 | Gaskell |
| 3,105,530 A | 10/1963 | Peterson |
| 3,124,178 A * | 3/1964 | Packard ........................ 83/473 |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,213,731 A | 10/1965 | Renard |

| | | | | | |
|---|---|---|---|---|---|
| 3,224,474 A | 12/1965 | Bloom | 4,029,159 A | 6/1977 | Nymann |
| 3,232,326 A | 2/1966 | Speer et al. | 4,047,156 A | 9/1977 | Atkins |
| 3,246,205 A | 4/1966 | Miller | 4,048,886 A | 9/1977 | Zettler |
| 3,249,134 A | 5/1966 | Vogl et al. | 4,060,160 A | 11/1977 | Lieber |
| 3,276,497 A | 10/1966 | Heer | 4,070,940 A | 1/1978 | McDaniel et al. |
| 3,280,861 A * | 10/1966 | Gjerde .................. 83/473 | 4,075,961 A | 2/1978 | Harris |
| 3,306,149 A | 2/1967 | John | 4,077,161 A | 3/1978 | Wyle et al. |
| 3,313,185 A | 4/1967 | Drake et al. | 4,085,303 A | 4/1978 | McIntyre et al. |
| 3,315,715 A | 4/1967 | Mytinger | 4,090,345 A | 5/1978 | Harkness |
| 3,323,814 A | 6/1967 | Phillips | 4,091,698 A | 5/1978 | Obear et al. |
| 3,337,008 A | 8/1967 | Trachte | 4,106,378 A | 8/1978 | Kaiser |
| 3,356,111 A | 12/1967 | Mitchell | 4,117,752 A | 10/1978 | Yoneda |
| 3,386,322 A | 6/1968 | Stone et al. | 4,145,940 A | 3/1979 | Woloveke et al. |
| 3,439,183 A | 4/1969 | Hurst, Jr. | 4,152,833 A | 5/1979 | Phillips |
| 3,445,835 A | 5/1969 | Fudaley | 4,161,649 A | 7/1979 | Klos et al. |
| 3,454,286 A | 7/1969 | Anderson et al. | 4,175,452 A | 11/1979 | Idel |
| 3,456,696 A | 7/1969 | Gregory et al. | 4,190,000 A | 2/1980 | Shaull et al. |
| 3,512,440 A | 5/1970 | Frydmann | 4,195,722 A | 4/1980 | Anderson et al. |
| 3,538,964 A | 11/1970 | Warrick et al. | 4,199,930 A | 4/1980 | Lebet et al. |
| 3,540,338 A | 11/1970 | McEwan et al. | 4,206,666 A | 6/1980 | Ashton |
| 3,554,067 A | 1/1971 | Scutella | 4,206,910 A | 6/1980 | Biesemeyer |
| 3,566,996 A | 3/1971 | Crossman | 4,249,117 A | 2/1981 | Leukhardt et al. |
| 3,580,376 A | 5/1971 | Loshbough | 4,249,442 A | 2/1981 | Fittery |
| 3,581,784 A | 6/1971 | Warrick | 4,262,278 A | 4/1981 | Howard et al. |
| 3,593,266 A | 7/1971 | Van Sickle | 4,267,914 A | 5/1981 | Saar |
| 3,613,748 A | 10/1971 | De Pue | 4,270,427 A | 6/1981 | Colberg et al. |
| 3,621,894 A | 11/1971 | Niksich | 4,276,459 A | 6/1981 | Willett et al. |
| 3,670,788 A * | 6/1972 | Pollak et al. ............... 83/508.2 | 4,276,799 A | 7/1981 | Muehling |
| 3,675,444 A | 7/1972 | Whipple | 4,291,794 A | 9/1981 | Bauer |
| 3,680,609 A | 8/1972 | Menge | 4,305,442 A | 12/1981 | Currie |
| 3,688,815 A | 9/1972 | Ridenour | 4,321,841 A | 3/1982 | Felix |
| 3,695,116 A | 10/1972 | Baur | 4,372,202 A | 2/1983 | Cameron |
| 3,696,844 A | 10/1972 | Bernatschek | 4,391,358 A | 7/1983 | Haeger |
| 3,716,113 A | 2/1973 | Kobayashi et al. | 4,418,597 A | 12/1983 | Krusemark et al. |
| 3,719,103 A | 3/1973 | Streander | 4,427,042 A | 1/1984 | Mitchell et al. |
| 3,745,546 A | 7/1973 | Struger et al. | 4,466,170 A | 8/1984 | Davis |
| 3,749,933 A | 7/1973 | Davidson | 4,466,233 A | 8/1984 | Thesman |
| 3,754,493 A | 8/1973 | Niehaus et al. | 4,470,046 A | 9/1984 | Betsill |
| 3,772,590 A | 11/1973 | Mikulecky et al. | 4,510,489 A | 4/1985 | Anderson, III et al. |
| 3,785,230 A | 1/1974 | Lokey | 4,512,224 A | 4/1985 | Terauchi |
| 3,793,915 A | 2/1974 | Hujer | 4,516,612 A * | 5/1985 | Wiley ..................... 144/1.1 |
| 3,805,639 A | 4/1974 | Peter | 4,518,043 A | 5/1985 | Anderson et al. |
| 3,805,658 A | 4/1974 | Scott et al. | 4,532,501 A | 7/1985 | Hoffman |
| 3,808,932 A | 5/1974 | Russell | 4,532,844 A | 8/1985 | Chang et al. |
| 3,829,850 A | 8/1974 | Guetersloh | 4,557,168 A | 12/1985 | Tokiwa |
| 3,829,970 A | 8/1974 | Anderson | 4,559,858 A | 12/1985 | Laskowski et al. |
| 3,841,188 A * | 10/1974 | Wiater .................. 83/471.3 | 4,560,033 A | 12/1985 | DeWoody et al. |
| 3,858,095 A | 12/1974 | Friemann et al. | 4,566,512 A | 1/1986 | Wilson |
| 3,861,016 A | 1/1975 | Johnson et al. | 4,573,556 A | 3/1986 | Andreasson |
| 3,863,208 A | 1/1975 | Balban | 4,576,073 A | 3/1986 | Stinson |
| 3,880,032 A | 4/1975 | Green | 4,589,047 A | 5/1986 | Gaus et al. |
| 3,882,744 A | 5/1975 | McCarroll | 4,589,860 A | 5/1986 | Brandenstein et al. |
| 3,886,413 A | 5/1975 | Dow et al. | 4,599,597 A | 7/1986 | Rotbart |
| 3,889,567 A | 6/1975 | Sato et al. | 4,599,927 A | 7/1986 | Eccardt et al. |
| 3,922,785 A | 12/1975 | Fushiya | 4,606,251 A | 8/1986 | Boileau |
| 3,924,688 A | 12/1975 | Cooper et al. | 4,615,247 A | 10/1986 | Berkeley |
| 3,931,727 A | 1/1976 | Luenser | 4,621,300 A | 11/1986 | Summerer |
| 3,935,777 A | 2/1976 | Bassett | 4,625,604 A | 12/1986 | Handler et al. |
| 3,945,286 A | 3/1976 | Smith | 4,637,188 A | 1/1987 | Crothers |
| 3,946,631 A | 3/1976 | Malm | 4,637,289 A | 1/1987 | Ramsden |
| 3,947,734 A | 3/1976 | Fyler | 4,644,832 A | 2/1987 | Smith |
| 3,949,636 A | 4/1976 | Ball et al. | 4,653,189 A | 3/1987 | Andreasson |
| 3,953,770 A | 4/1976 | Hayashi | 4,657,428 A | 4/1987 | Wiley |
| 3,960,310 A | 6/1976 | Nussbaum | 4,672,500 A | 6/1987 | Tholome |
| 3,967,161 A | 6/1976 | Lichtblau | 4,675,664 A | 6/1987 | Cloutier et al. |
| 3,974,565 A | 8/1976 | Ellis | 4,679,719 A | 7/1987 | Kramer |
| 3,975,600 A | 8/1976 | Marston | 4,722,021 A | 1/1988 | Hornung et al. |
| 3,978,624 A | 9/1976 | Merkel et al. | 4,751,603 A | 6/1988 | Kwan |
| 3,994,192 A | 11/1976 | Faig | 4,756,220 A | 7/1988 | Olsen et al. |
| 4,007,679 A | 2/1977 | Edwards | 4,757,881 A | 7/1988 | Jonsson et al. |
| 4,016,490 A | 4/1977 | Weckenmann et al. | 4,774,866 A | 10/1988 | Dehari et al. |
| 4,026,174 A | 5/1977 | Fierro | 4,792,965 A | 12/1988 | Morgan |
| 4,026,177 A | 5/1977 | Lokey | 4,805,504 A | 2/1989 | Fushiya et al. |

| | | | | | |
|---|---|---|---|---|---|
| 4,831,279 A | 5/1989 | Ingraham | 5,592,353 A | 1/1997 | Shinohara et al. |
| 4,840,135 A | 6/1989 | Yamauchi | 5,606,889 A | 3/1997 | Bielinski et al. |
| 4,845,476 A | 7/1989 | Rangeard et al. | 5,619,896 A | 4/1997 | Chen |
| 4,864,455 A | 9/1989 | Shimomura et al. | 5,623,860 A | 4/1997 | Schoene et al. |
| 4,875,398 A | 10/1989 | Taylor et al. | 5,647,258 A | 7/1997 | Brazell et al. |
| 4,896,607 A | 1/1990 | Hall et al. | 5,648,644 A | 7/1997 | Nagel |
| 4,906,962 A | 3/1990 | Duimstra | 5,659,454 A | 8/1997 | Vermesse |
| 4,907,679 A | 3/1990 | Menke | 5,667,152 A | 9/1997 | Mooring |
| 4,934,233 A | 6/1990 | Brundage et al. | 5,671,633 A | 9/1997 | Wagner |
| 4,936,876 A | 6/1990 | Reyes | 5,695,306 A | 12/1997 | Nygren, Jr. |
| 4,937,554 A | 6/1990 | Herman | 5,700,165 A | 12/1997 | Harris et al. |
| 4,964,450 A | 10/1990 | Hughes et al. | 5,722,308 A | 3/1998 | Ceroll et al. |
| 4,965,909 A | 10/1990 | McCullough et al. | 5,724,875 A | 3/1998 | Meredith et al. |
| 4,975,798 A | 12/1990 | Edwards et al. | 5,730,165 A | 3/1998 | Philipp |
| 5,020,406 A | 6/1991 | Sasaki et al. | 5,741,048 A | 4/1998 | Eccleston |
| 5,025,175 A | 6/1991 | Dubois, III | 5,755,148 A | 5/1998 | Stumpf et al. |
| 5,042,348 A | 8/1991 | Brundage et al. | 5,771,742 A | 6/1998 | Bokaie et al. |
| 5,046,426 A | 9/1991 | Julien et al. | 5,782,001 A | 7/1998 | Gray |
| 5,052,255 A | 10/1991 | Gaines | 5,787,779 A | 8/1998 | Garuglieri |
| 5,074,047 A | 12/1991 | King | 5,791,057 A | 8/1998 | Nakamura et al. |
| 5,081,406 A | 1/1992 | Hughes et al. | 5,791,223 A | 8/1998 | Lanzer |
| 5,082,316 A | 1/1992 | Wardlaw | 5,791,224 A | 8/1998 | Suzuki et al. |
| 5,083,973 A | 1/1992 | Townsend | 5,791,441 A | 8/1998 | Matos et al. |
| 5,086,890 A | 2/1992 | Turczyn et al. | 5,819,619 A | 10/1998 | Miller et al. |
| 5,094,000 A | 3/1992 | Becht et al. | 5,852,951 A | 12/1998 | Santi |
| 5,116,249 A | 5/1992 | Shiotani et al. | 5,857,507 A | 1/1999 | Puzio et al. |
| 5,119,555 A | 6/1992 | Johnson | 5,861,809 A | 1/1999 | Eckstein et al. |
| 5,122,091 A | 6/1992 | Townsend | 5,875,698 A | 3/1999 | Ceroll et al. |
| 5,174,349 A | 12/1992 | Svetlik et al. | 5,880,954 A | 3/1999 | Thomson et al. |
| 5,184,534 A | 2/1993 | Lee | 5,921,367 A | 7/1999 | Kashioka et al. |
| 5,198,702 A | 3/1993 | McCullough et al. | 5,927,857 A | 7/1999 | Ceroll et al. |
| 5,199,343 A | 4/1993 | OBanion | 5,930,096 A | 7/1999 | Kim |
| 5,201,110 A | 4/1993 | Bane | 5,937,720 A | 8/1999 | Itzov |
| 5,201,684 A | 4/1993 | DeBois, III | 5,942,975 A | 8/1999 | Sorensen |
| 5,206,625 A | 4/1993 | Davis | 5,943,932 A | 8/1999 | Sberveglieri |
| 5,207,253 A | 5/1993 | Hoshino et al. | 5,950,514 A | 9/1999 | Benedict et al. |
| 5,212,621 A | 5/1993 | Panter | 5,963,173 A | 10/1999 | Lian et al. |
| 5,218,189 A | 6/1993 | Hutchison | 5,974,927 A | 11/1999 | Tsune |
| 5,231,359 A | 7/1993 | Masuda et al. | 5,989,116 A | 11/1999 | Johnson et al. |
| 5,231,906 A | 8/1993 | Kogej | 6,009,782 A | 1/2000 | Tajima et al. |
| 5,239,978 A | 8/1993 | Plangetis | 6,018,284 A | 1/2000 | Rival et al. |
| 5,245,879 A | 9/1993 | McKeon | 6,037,729 A | 3/2000 | Woods et al. |
| 5,257,570 A | 11/1993 | Shiotani et al. | D422,290 S | 4/2000 | Welsh et al. |
| 5,265,510 A | 11/1993 | Hoyer-Ellefsen | 6,052,884 A | 4/2000 | Steckler et al. |
| 5,272,946 A | 12/1993 | McCullough et al. | 6,062,121 A | 5/2000 | Ceroll et al. |
| 5,276,431 A | 1/1994 | Piccoli et al. | 6,070,484 A | 6/2000 | Sakamaki |
| 5,285,708 A | 2/1994 | Bosten et al. | 6,095,092 A | 8/2000 | Chou |
| 5,293,802 A | 3/1994 | Shiotani et al. | 6,112,785 A | 9/2000 | Yu |
| 5,320,382 A | 6/1994 | Goldstein et al. | 6,119,984 A | 9/2000 | Devine |
| 5,321,230 A | 6/1994 | Shanklin et al. | 6,131,629 A | 10/2000 | Puzio et al. |
| 5,331,875 A | 7/1994 | Mayfield | 6,133,818 A | 10/2000 | Shieh et al. |
| 5,353,670 A | 10/1994 | Metzger, Jr. | 6,141,192 A | 10/2000 | Garzon |
| 5,377,554 A | 1/1995 | Reulein et al. | 6,148,504 A | 11/2000 | Schmidt et al. |
| 5,377,571 A | 1/1995 | Josephs | 6,148,703 A | 11/2000 | Ceroll et al. |
| 5,392,568 A | 2/1995 | Howard, Jr. et al. | 6,150,826 A | 11/2000 | Hokodate et al. |
| 5,392,678 A | 2/1995 | Sasaki et al. | 6,161,459 A | 12/2000 | Ceroll et al. |
| 5,401,928 A | 3/1995 | Kelley | 6,170,370 B1 | 1/2001 | Sommerville |
| 5,411,221 A | 5/1995 | Collins et al. | 6,244,149 B1 | 6/2001 | Ceroll et al. |
| 5,423,232 A | 6/1995 | Miller et al. | 6,250,190 B1 | 6/2001 | Ceroll et al. |
| 5,436,613 A | 7/1995 | Ghosh et al. | 6,257,061 B1 | 7/2001 | Nonoyama et al. |
| 5,447,085 A | 9/1995 | Gochnauer | 6,325,195 B1 | 12/2001 | Doherty |
| 5,451,750 A | 9/1995 | An | 6,330,848 B1 | 12/2001 | Nishio et al. |
| 5,453,903 A | 9/1995 | Chow | 6,336,273 B1 | 1/2002 | Nilsson et al. |
| 5,471,888 A | 12/1995 | McCormick | 6,352,137 B1 | 3/2002 | Stegall et al. |
| 5,480,009 A | 1/1996 | Wieland et al. | 6,357,328 B1 | 3/2002 | Ceroll et al. |
| 5,503,059 A | 4/1996 | Pacholok | 6,366,099 B1 | 4/2002 | Reddi |
| 5,510,587 A | 4/1996 | Reiter | 6,376,939 B1 | 4/2002 | Suzuki et al. |
| 5,510,685 A | 4/1996 | Grasselli | 6,404,098 B1 | 6/2002 | Kayama et al. |
| 5,513,548 A | 5/1996 | Garuglieri | 6,405,624 B2 | 6/2002 | Sutton |
| 5,531,147 A | 7/1996 | Serban | 6,418,829 B1 | 7/2002 | Pilchowski |
| 5,534,836 A | 7/1996 | Schenkel et al. | 6,420,814 B1 | 7/2002 | Bobbio |
| 5,572,916 A | 11/1996 | Takano | 6,427,570 B1 | 8/2002 | Miller et al. |
| 5,587,618 A | 12/1996 | Hathaway | 6,430,007 B1 | 8/2002 | Jabbari |

| | | |
|---|---|---|
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |

GB 2142571 1/1985

OTHER PUBLICATIONS

Shop Fox® Fence Operating Manual, Woodstock International, Inc., 1996, revised May 1997.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, Jet Equipment & Tools, Mar. 2001.
XACTA Fence II™ Commercial 30/50 Owner's Manual, Jet Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, Jet Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.

INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
Analog Devices, Inc., 3-Axis Capacitive Sensor—Preliminary Technical Data AD7103, pp. 1-40, © 1998.
Gordon Engineering Corp., Product Catalog, Oct. 1997, pp. cover, 1, 3 and back; Brookfield, Connecticut, US.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show CD.

* cited by examiner

Detail A

Detail B

Detail C

Detail D

Detail E

TABLE SAWS WITH SAFETY SYSTEMS

CROSS-REFERENCE TO RELATED APPLICATION

This application claims the benefit of and priority from the following U.S. Provisional Patent Application, the disclosure of which is herein incorporated by reference: Ser. No. 60/533,811, filed Dec. 31, 2003.

FIELD

The present invention relates to table saws and more particularly to table saws with safety systems.

BACKGROUND

A table saw is a power tool used to cut a work piece to a desired size. A table saw includes a work surface or table and a circular blade extending up through the table. A person uses a table saw by holding a work piece on the table and feeding it past the spinning blade to make a cut. The table saw is one of the most basic machines used in woodworking.

The blade of a table saw, however, presents a risk of injury to a user of the saw. If the user accidentally places their hand in the path of the blade, or if their hand slips into the blade, then the user could receive a serious injury or amputation. Accidents also happen because of what is called kickback. Kickback may occur when a work piece contacts the downstream edge of the blade as it is being cut. The blade then propels the work piece back toward the user at a high velocity. When this happens, the user's hand may be carried into the blade because of the sudden and unexpected movement of the work piece.

Safety systems or features are incorporated into table saws to minimize the risk of injury. Probably the most common safety feature is a guard that physically blocks an operator from making contact with the blade. In many cases, guards effectively reduce the risk of injury, however, there are many instances where the nature of the operations to be performed precludes using a guard that completely blocks access to the blade.

Other safety systems have been developed to detect when a human body contacts a predetermined portion of a machine, such as detecting when a user's hand touches the moving blade on a saw. When that contact is detected, the safety systems react to minimize injury.

The present document discloses an improved design for a table saw. The design is particularly adapted to implement safety systems that detect and react to dangerous conditions.

DETAILED DESCRIPTION

Figure 1:
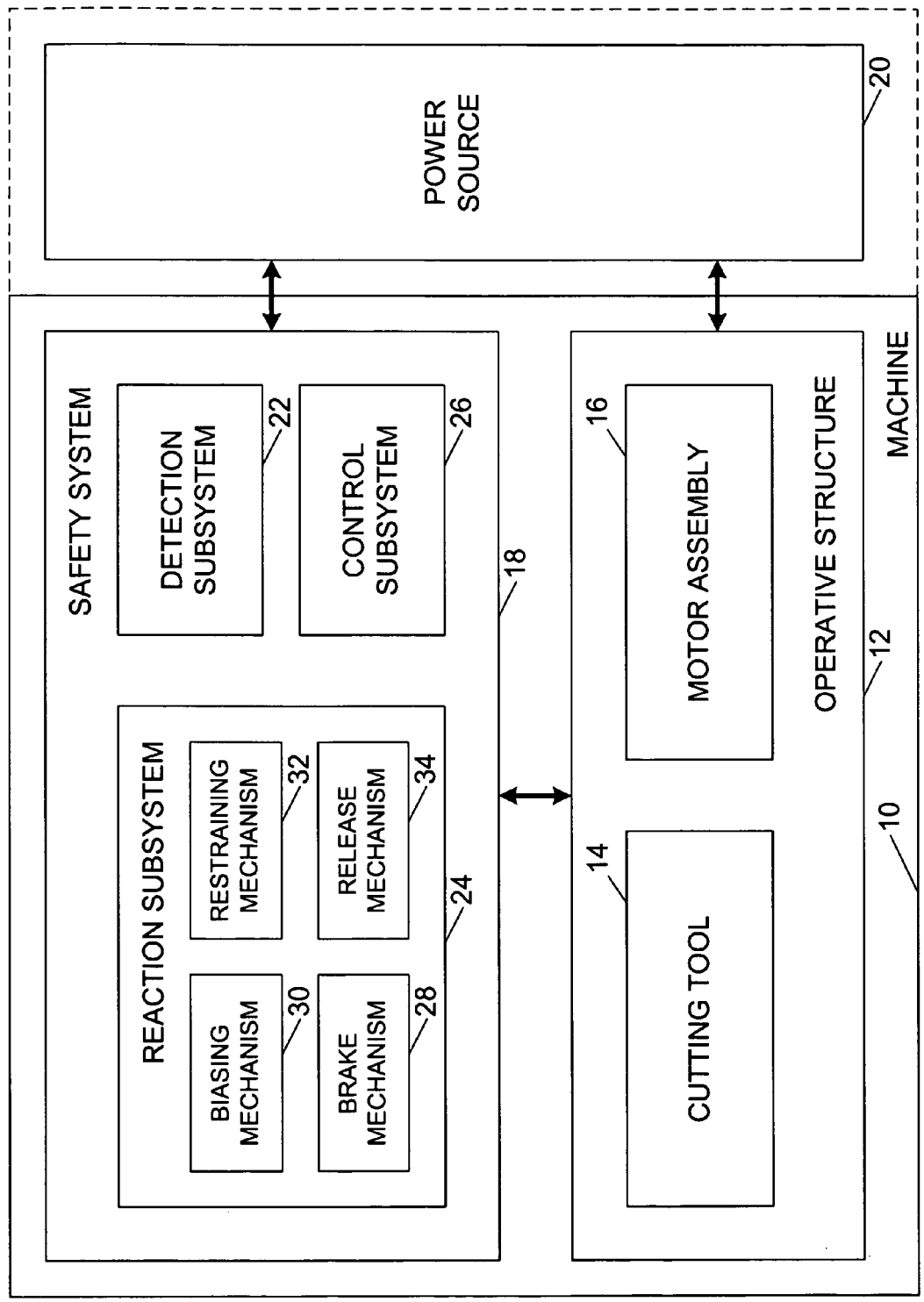
FIG. 1 is a schematic block diagram of a machine with a fast-acting safety system.

A machine that incorporates a safety system to detect and react to a dangerous condition, such as human contact with a designated portion of the machine, is shown schematically in FIG. 1 and indicated generally at 10. Machine 10 may be any of a variety of different machines, such as table saws, miter saws, band saws, jointers, shapers, routers, hand-held circular saws, up-cut saws, sanders, etc. Machine 10 includes an operative structure 12 having a working or cutting tool 14 and a motor assembly 16 adapted to drive the cutting tool. Machine 10 also includes a safety system 18 configured to minimize the potential of a serious injury to a person using the machine. Safety system 18 is adapted to detect the occurrence of one or more dangerous conditions during use of the machine. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms. For example, operative structure 12 may include a stationary housing configured to support motor assembly 16 in driving engagement with cutting tool 14. Alternatively, operative structure 12 may include one or more transport mechanisms adapted to convey a work piece toward and/or away from cutting tool 14.

Motor assembly 16 includes at least one motor adapted to drive cutting tool 14. The motor may be either directly or indirectly coupled to the cutting tool, and may also be adapted to drive work piece transport mechanisms. The particular form of cutting tool 14 will vary depending upon the various embodiments of machine 10. For example, cutting tool 14 may be a single, circular rotating blade having a plurality of teeth disposed along the perimetrical edge of the blade. Alternatively, the cutting tool may be a plurality of circular blades, such as a dado blade or dado stack, or some other type of blade or working tool.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous or triggering conditions during use of machine 10. For example, the detection subsystem may be configured to detect that a portion of the user's body is dangerously close to or in contact with a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," and U.S. Patent Application Ser. No. 60/452,159, filed Mar. 5, 2003, entitled "Retraction System and Motor Position for Use With Safety Systems for Power Equipment," the disclosures of which are herein incorporated by reference.

The configuration of reaction subsystem 24 typically will vary depending on which action or actions are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
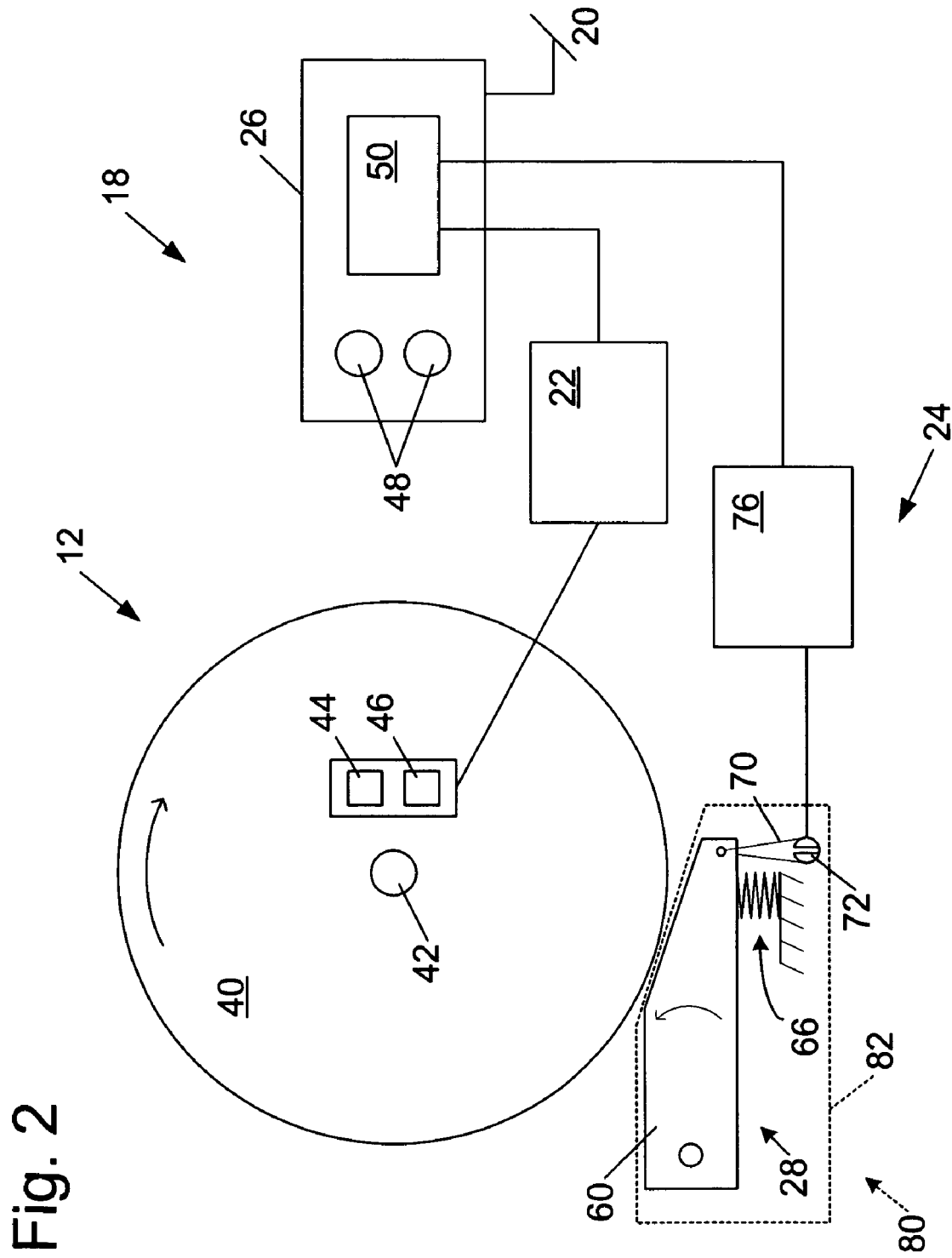
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. Patent Application Publication No. 2003/0015253 A1, entitled "Router With Improved Safety System," U.S. Patent Application Publication No. 2002/0170400 A1, entitled "Band Saw With Improved Safety System," U.S. Patent Application Publication No. 2003/0019341 A1, entitled "Safety Systems for Band Saws," U.S. Patent Application Publication No. 2003/0056853 A1, entitled "Router With Improved Safety System," U.S. Provisional Patent Application Ser. No. 60/406,138, entitled "Miter Saw With Improved Safety System," and U.S. Provisional Patent Application Ser. No. 60/496,550, entitled "Table Saws With Safety Systems," the disclosures of which are herein incorporated by reference, describe safety system 18 in the context of particular types of machines.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," U.S. Patent Application Publication No. 2003/0090224 A1, entitled "Detection System for Power Equipment," and U.S. Provisional Patent Application Ser. No. 60/533,791, entitled "Improved Detection Systems for Power Equipment," the disclosures of which are all herein incorporated by reference.

Control subsystem 26 includes one or more instruments 48 that are operable by a user to control the motion of blade 40. Instruments 48 may include start/stop switches, speed controls, direction controls, light-emitting diodes, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, work piece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26, and components that may be used in control system 26, are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," U.S. Patent Application Publication No. 2003/0058121 A1, entitled "Logic Control With Test Mode for Fast-Acting Safety System," U.S. Provisional Patent Application Ser. No. 60/496,568, entitled "Motion Detecting System for use in a Safety System for Power Equipment," and U.S. Provisional Patent Application Ser. No. 60/533,598, entitled "Switch Box for Power Tools with Safety Systems," the disclosures of which are all herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as fully annealed aluminum, etc. It will be appreciated that the construction of pawl 60 may vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. Patent Application Publication No. 2003/0020336 A1, entitled "Actuators For Use In Fast-Acting Safety Systems," the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," U.S. Patent Application Publication No. 2003/0140749 A1, entitled "Brake Pawls for Power Equipment," and U.S. Provisional Patent Application Ser. No. 60/496,574, entitled "Brake Cartridges for Power Equipment," the disclosures of which are herein incorporated by reference.

While one particular implementation of safety system 18 has been described, it will be appreciated that many variations and modifications are possible. Many such variations and modifications are described in U.S. Patent Application Publication No. 2002/0170399 A1, entitled "Safety Systems for Power Equipment," U.S. Patent Application Publication No. 2003/0037651, entitled "Safety Systems for Power Equipment," and U.S. Patent Application Publication No. 2003/0131703 A1, entitled "Apparatus and Method for Detecting Dangerous Conditions in Power Equipment," the disclosures of which are herein incorporated by reference.

Figure 3:
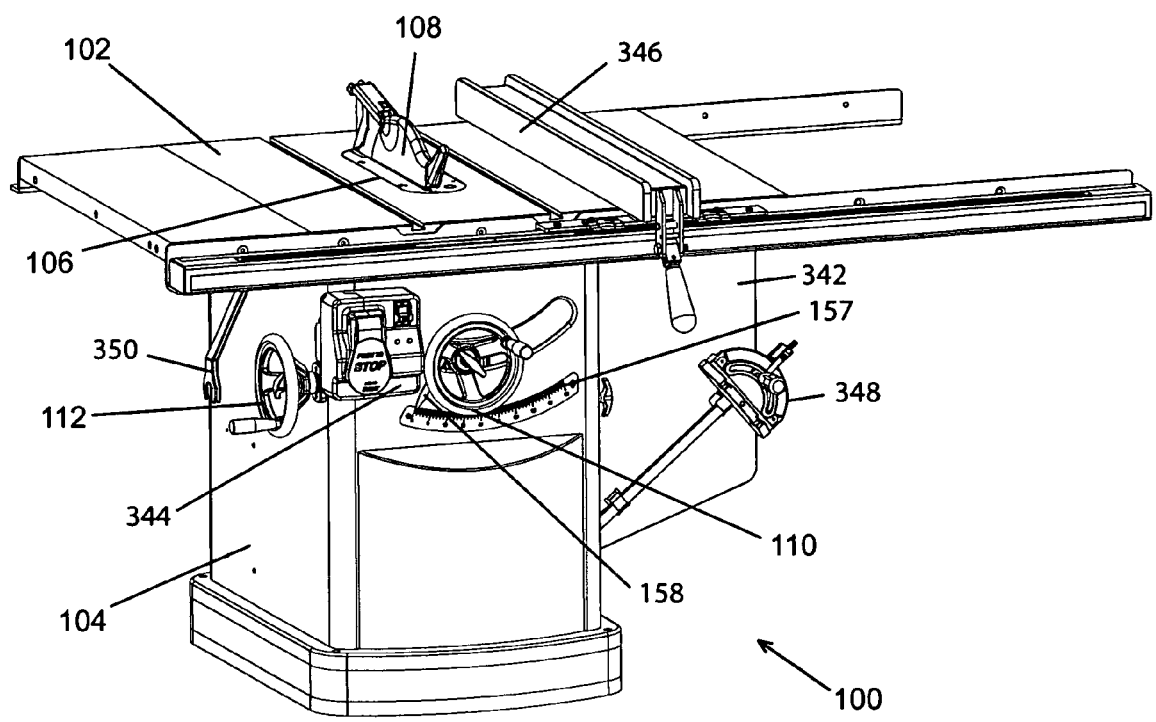
FIG. 3 shows a table saw.

A table saw adapted to implement features of the safety systems described above is shown at 100 in FIG. 3. Saw 100 is often called a cabinet saw or a tilting-arbor saw. The saw includes a table 102 on which a work piece may be cut. The table is supported by a cabinet 104. A blade 105 (labeled in FIGS. 4 through 7) extends up through an opening 106 in the table and a blade guard 108 covers the blade. Hand wheels 110 and 112 may be turned to adjust the elevation of the blade (the height the blade extends above the table) and the tilt of the blade relative to the tabletop, respectively. In operation, a user turns the hand wheels to position the blade as desired and then makes a cut by pushing a work piece on the table past the spinning blade.

FIGS. 4 through 7 show various views of the internal mechanism of saw 100. FIGS. 8 through 13 show additional views of the internal mechanism of the saw, but with the table removed. The remaining figures show various components and mechanisms that may be used in the saw.

Table 102 is bolted onto a front trunnion bracket 120 and a back trunnion bracket 122 by bolts 124 (the bolts are shown best in FIGS. 10 through 13). The trunnion brackets, in turn, are bolted onto and supported by cabinet 104 through holes such as hole 107 shown in FIG. 8. The cabinet is constructed to support the weight of the table and the internal mechanism of the saw. Alternatively, table 102 could be secured directly to the cabinet or some other support instead of to the trunnions.

Figure 4:
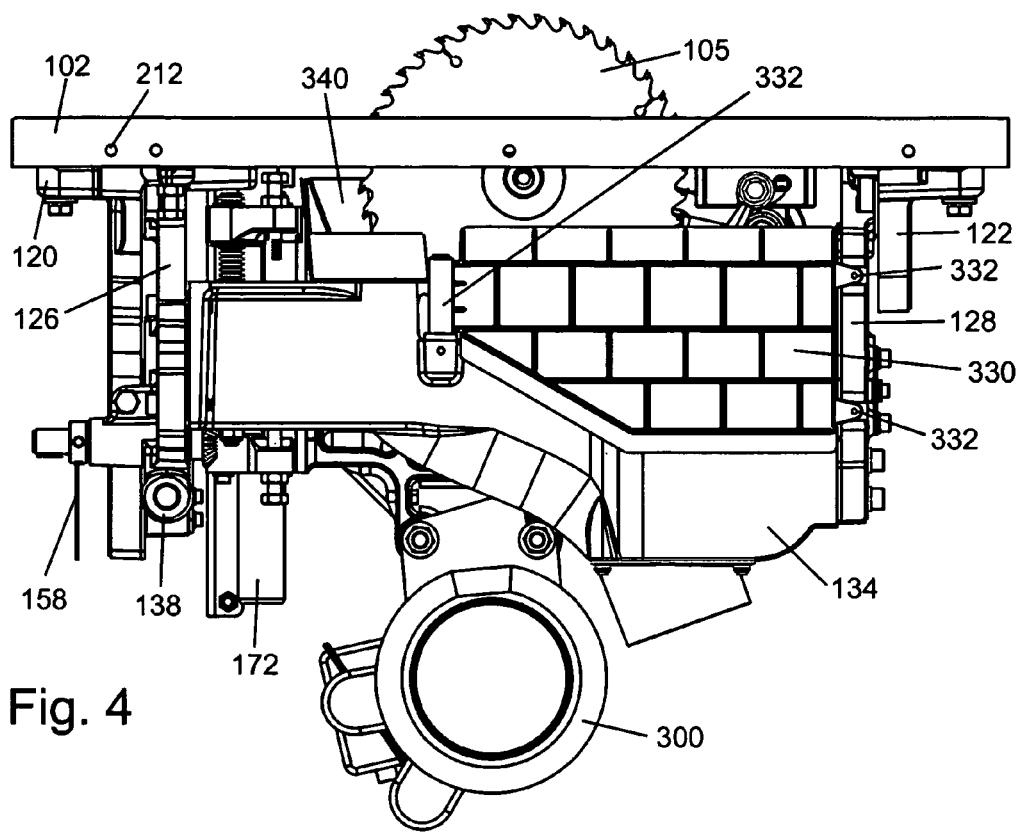
FIG. 4 shows a right-side view of the internal mechanism of the saw shown in FIG. 3.
Figure 5:
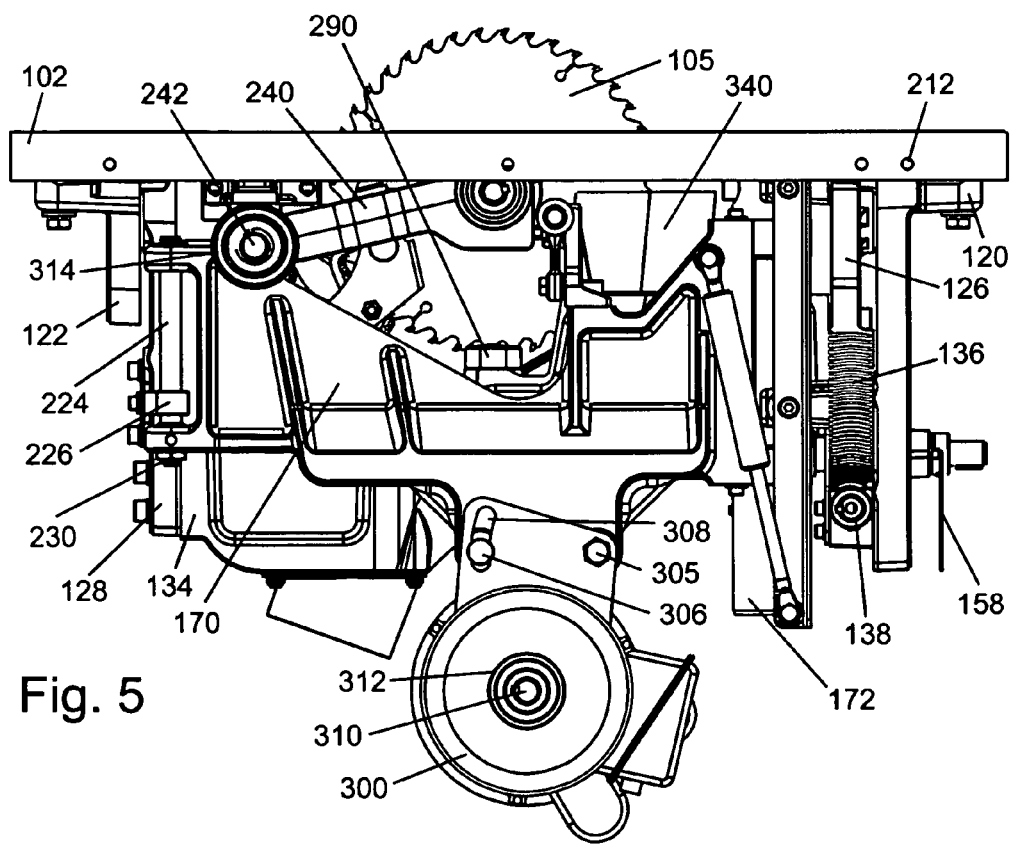
FIG. 5 shows a left-side view of the internal mechanism of the saw shown in FIG. 3.
Figure 13:
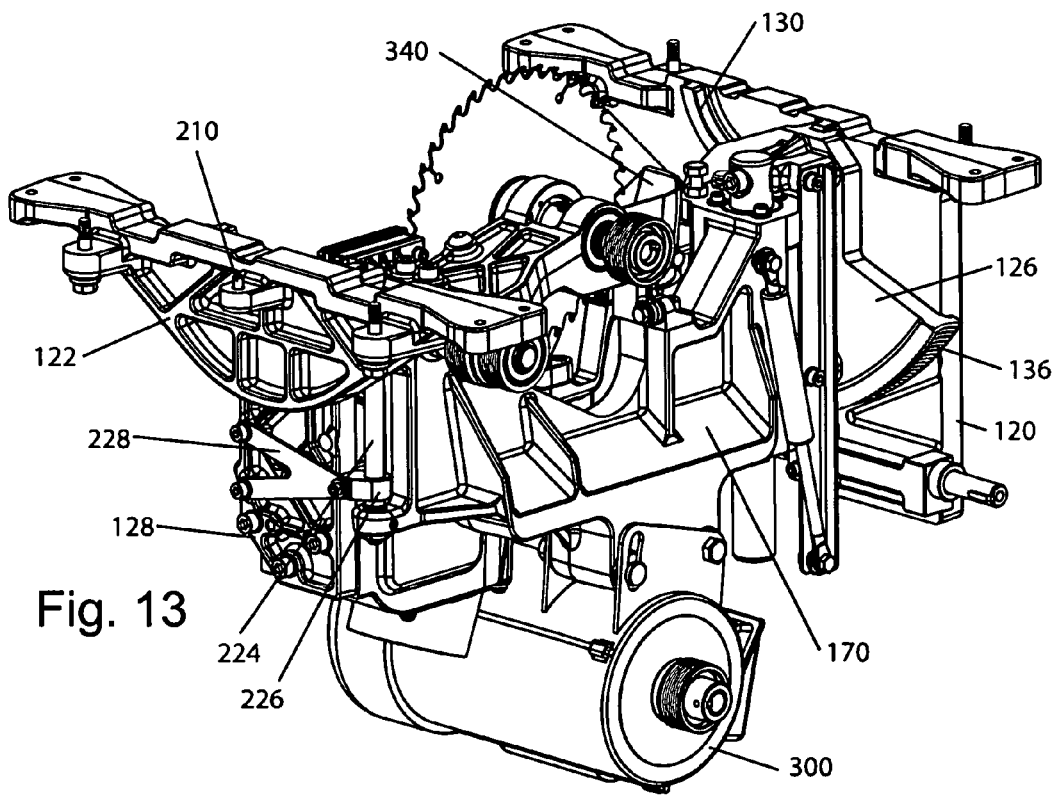
FIG. 13 shows a back-left perspective view of the internal mechanism of the saw.

It is important for the table to be positioned properly relative to the blade. Typically, the front edge of the table should be as perpendicular to the plane of the blade as possible in order to make straight, square cuts. There are many mechanisms by which the position of the table relative to the blade can be adjusted. FIGS. 4, 5, and 13 show one such mechanism. A pin 210 extends up from a flange in rear trunnion bracket 122, as shown in FIG. 13. That pin is positioned substantially in the side-to-side center of the rear trunnion bracket. Pin 210 extends up into a corresponding socket on the underside of the back edge of the table and the table is able to pivot around the pin. Table 102 includes two holes 212, one in the right front side of the table and one in the left front side, as shown in FIGS. 4 and 5. A bolt is threaded into each of those holes and extends through the side of the table. Holes 212 are positioned so that when the bolts are threaded through the holes, the ends of the bolts abut the right and left sides of the front trunnion bracket, respectively. Those sides are labeled 213 in FIG. 8. Threading a bolt farther into its hole will cause the bolt to push against the front trunnion bracket and the table will then pivot around pin 210. Thus, the position or squareness of the table relative to the blade can be adjusted by threading the bolts into holes 212 a desired amount.

Saw 100 also includes front and rear trunnions 126 and 128. These trunnions are supported in the saw by the front end rear trunnion brackets, respectively. Each trunnion bracket includes an arcuate tongue or flange 130 (best seen in FIGS. 10 through 13), and the front and rear trunnions each include a corresponding arcuate groove 132 (grooves 132 are labeled in FIGS. 10 and 12). Trunnion brackets 120 and 122 support trunnions 128 and 128 by flanges 130 extending into corresponding grooves 132. In this manner, the flanges provide a shoulder or surface on which the trunnions may rest. The arcuate tongue and groove connections also allow the trunnions to slide relative to the trunnion brackets. When the trunnions slide on the trunnion brackets, the blade of the saw tilts relative to the tabletop because the blade is supported by the trunnions, as will be explained below.

A trunnion brace 134 extends between and interconnects the front and rear trunnions so that the trunnions move together. The trunnion brace also holds the front and rear trunnions square and prevents the trunnions from moving off flanges 132 when the mechanism is assembled. The trunnion brackets, trunnions and trunnion brace are shown isolated from other structure in FIGS. 14 through 16.

The trunnions and trunnion brace are tilted relative to the trunnion brackets by gears. A rack gear 136 is cut into an edge of front trunnion 126, and a worm gear 138 is mounted on front trunnion bracket 120 to mesh with the rack gear. This arrangement is shown in detail in FIGS. 17 through 20. Worm gear 138 is mounted on a shaft 140 and the shaft is supported in a bracket 142. A collar 143 holds the shaft in place in the bracket. Bracket 142 is bolted onto front trunnion bracket 120 by bolts 144. The bolts pass through oversized holes in the front trunnion bracket and thread into holes in bracket 142. The oversized holes in the front trunnion bracket allow for adjustment of the position of bracket 142 up or down relative to the rack gear. Being able to adjust the position of the bracket up or down is important in order to make sure the rack and worm gears mesh properly. Of course, the oversized holes may be in bracket 142 and the threaded holes may be in the front trunnion bracket.

Figure 37:
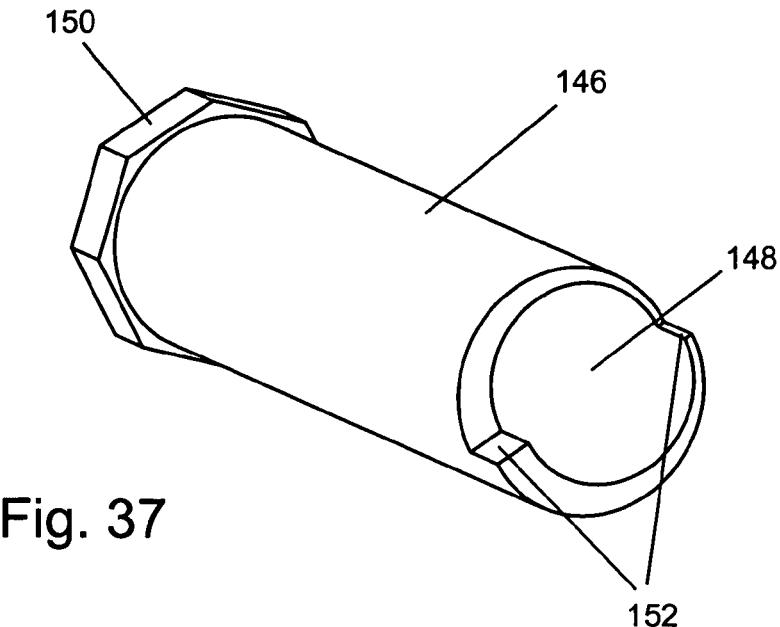
FIG. 37 shows an eccentric bushing.
Figure 38:
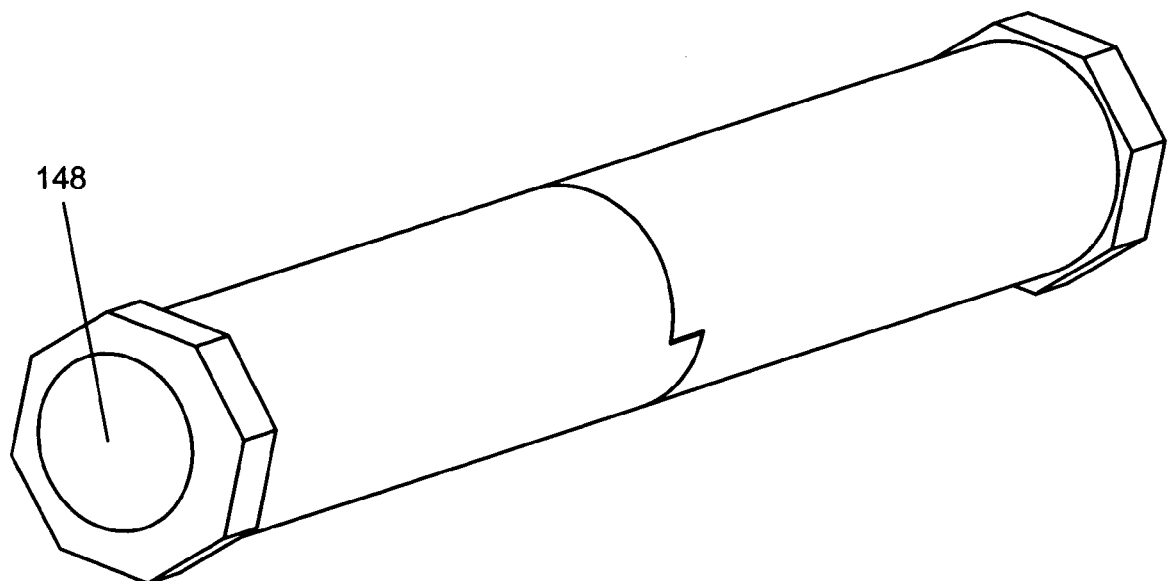
FIG. 38 shows two eccentric bushings end-to-end.

Other mechanisms also may be used to align worm gear 138 with rack gear 136. One such mechanism is one or more eccentric bushings that hold shaft 140 in bracket 142. The bushings may be turned to move shaft 140 and worm gear 138 toward or away from rack gear 136 to make sure the gears mesh properly. A possible eccentric bushing is shown in FIG. 37 at 146. The bushing includes a hole 148 positioned off-center from the longitudinal axis of the bushing, a hex head 150 to allow a person to turn the bushing, and shoulders 152. The bushing is configured so that two such bushings may be positioned end to end, as shown in FIG. 38, and shaft 140 may be supported in the resulting hole 148. When the bushings are positioned in bracket 142, turning either of the two hex heads 150 with a wrench will cause both bushings to turn because shoulders 152 abut, and turning the bushings will cause shaft 140 and worm gear 138 to move toward or away from rack gear 136 because hole 148 is off center.

Figure 18:
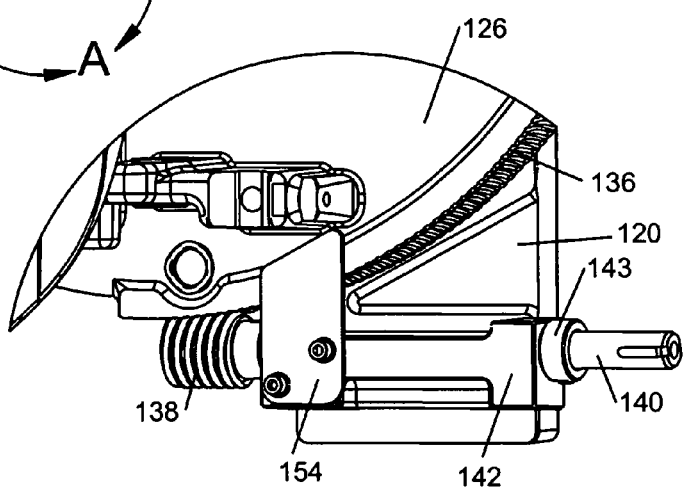
FIG. 18 is the detail view of the portion labeled "A" in FIG. 17, showing part of a tilt control mechanism.
Figure 19:
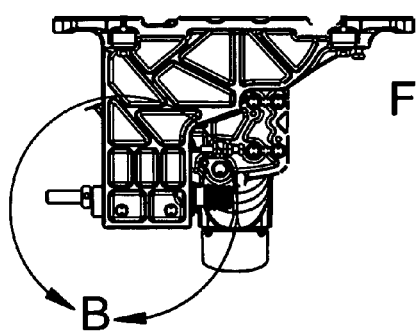
FIG. 19 shows part of the internal mechanism of the saw with a portion labeled "B" designated for a detailed view.
Figure 20:
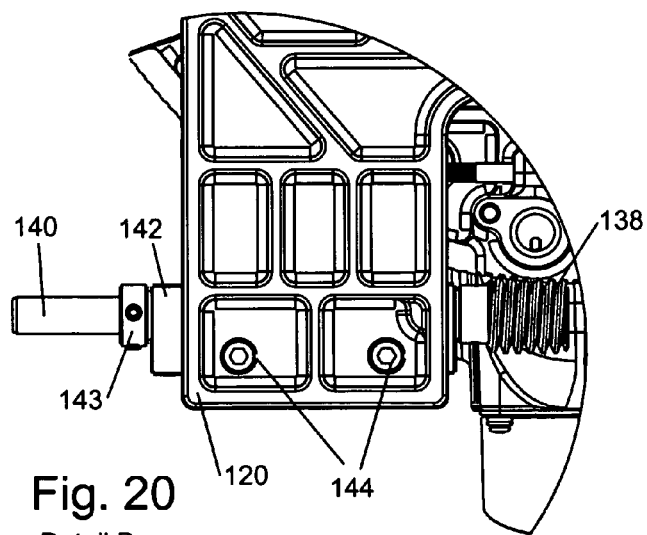
FIG. 20 is the detail view of the portion labeled "B" in FIG. 19, showing part of a tilt control mechanism.

Shaft 140 extends out through a hole in cabinet 104 and hand wheel 112 is mounted on the shaft. When a user turns hand wheel 112 and shaft 140, worm gear 138 meshes with rack gear 136 causing the trunnions to move and the blade to tilt relative to the tabletop. A plate 154 is bolted to bracket 142 and extends up past rack gear 136, as shown in FIG. 18, to help prevent the bottom of front trunnion 126 from moving away from the front trunnion bracket and to help maintain the rack gear and worm gear in position.

Figure 6:
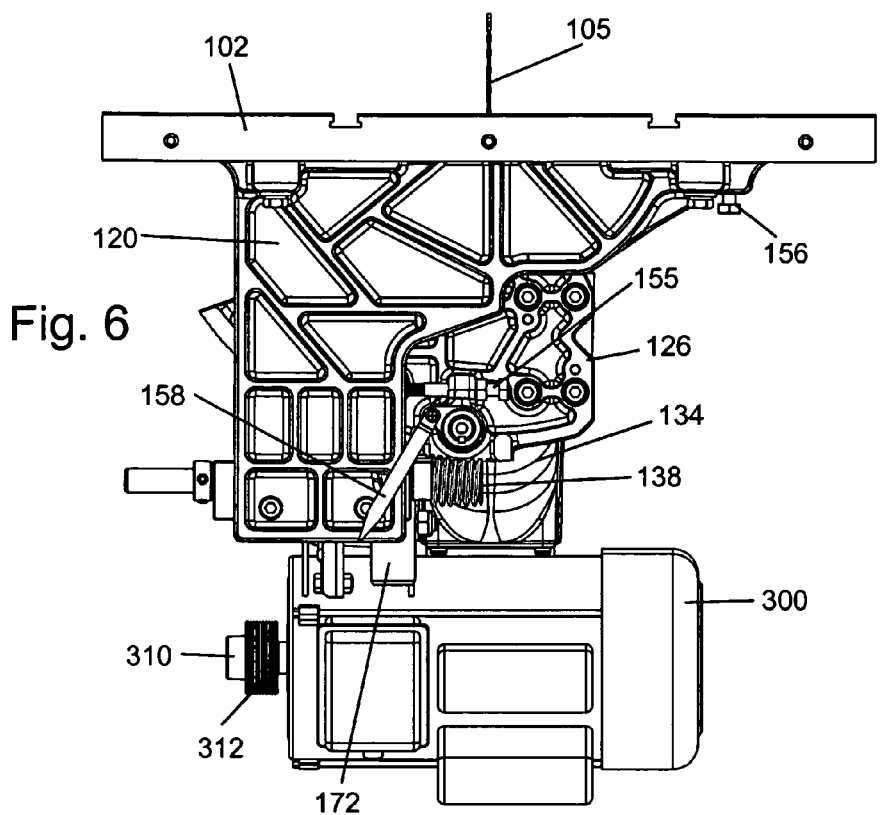
FIG. 6 shows a front view of the internal mechanism of the saw shown in FIG. 3.
Figure 7:
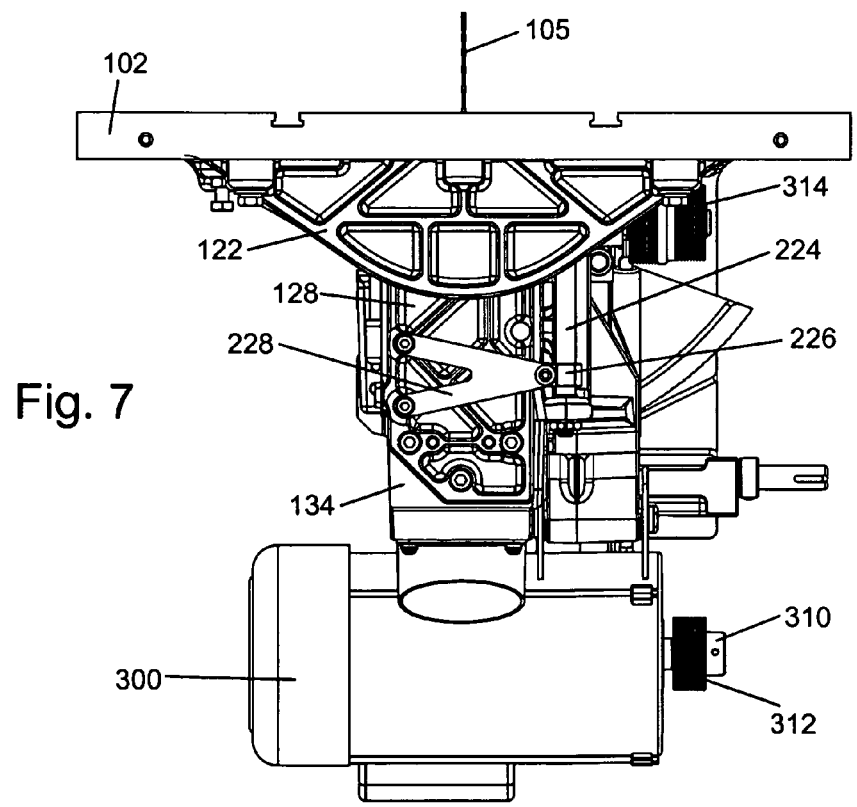
FIG. 7 shows a back view of the internal mechanism of the saw shown in FIG. 3.
Figure 8:
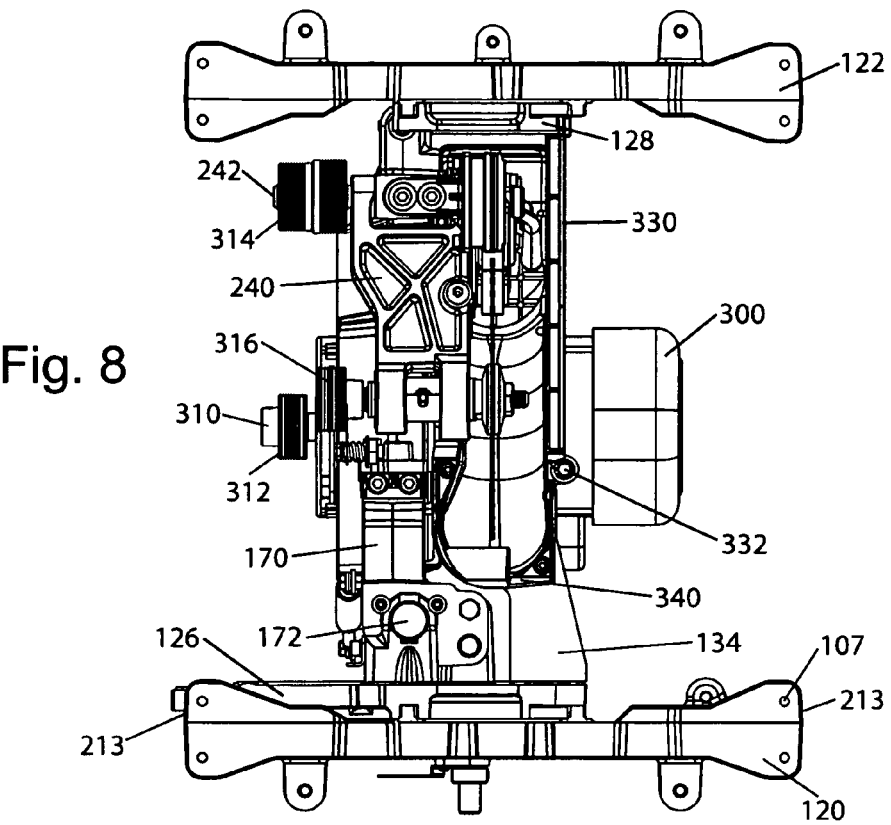
FIG. 8 shows a top view of the internal mechanism of the saw shown in FIG. 3 with the table removed.
Figure 9:
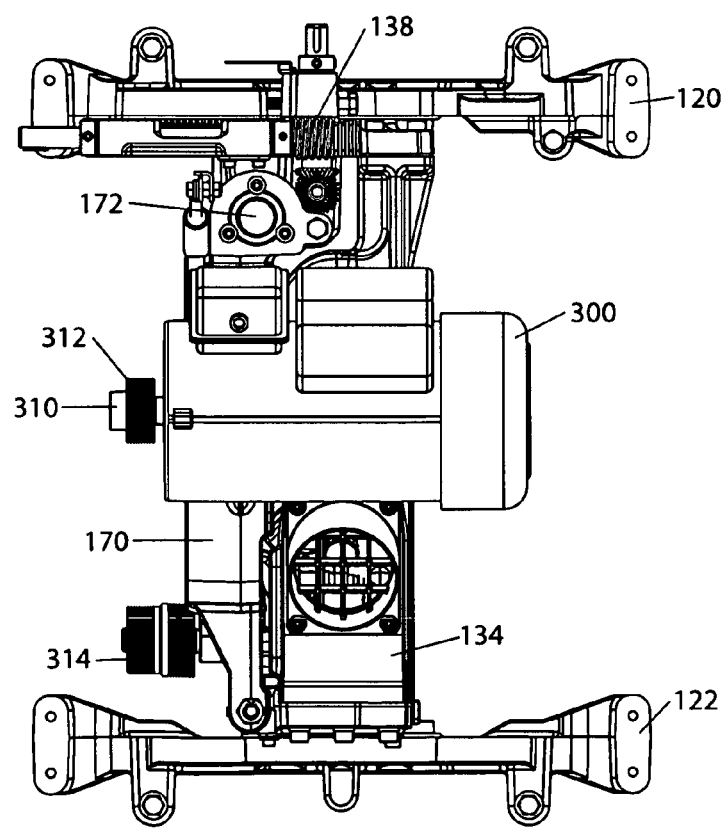
FIG. 9 shows a bottom view of the internal mechanism of the saw shown in FIG. 3.

Stops 155 and 156, shown best in FIG. 6, limit the distance that the trunnions and trunnion brace may move. Stop 155 comprises a bolt threaded through a shoulder in the front trunnion bracket and a lock nut to hold the bolt in place. The bolt is positioned so that it will abut a side edge of the front trunnion bracket when the front trunnion is at one limit of its movement, as shown in FIG. 6. Stop 156 comprises a bolt threaded into a hole in the front trunnion bracket (also shown in FIG. 25). A lock nut or some other means may be used to hold the bolt in place. The bolt is positioned so that the front trunnion will abut the head of the bolt when the front trunnion is at the opposite limit of its movement. The distance the trunnions may move can be adjusted by threading the bolts in stops 155 and 156 in or out, as desired.

Saw 100 typically includes a label 157 mounted on the front of the cabinet. Label 157 includes angle demarcations to indicate the degree the blade tilts relative to the tabletop. A pointer 158 is mounted on or adjacent shaft 140 to point to the angle demarcations on label 157. For instance, when the blade is tilted 45 degrees relative to the tabletop, pointer 158 would point to the 45 degree mark on label 157. In the depicted embodiment, pointer 158 is mounted to the front trunnion, adjacent shaft 140.

Saw 100 also includes an elevation plate 170. The elevation plate is supported by the front and rear trunnions and tilts with the trunnions. The blade is supported on the elevation plate, as will be described, so tilting the elevation plate causes the blade to tilt. The elevation plate is also configured to move up and down relative to the trunnions. Moving the elevation plate up and down is what causes the blade to move up and down relative to the tabletop.

Figure 39:
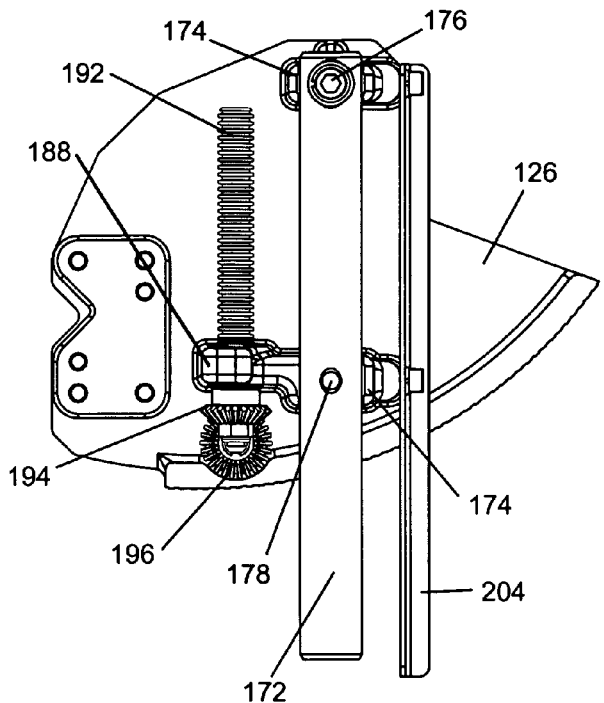
FIG. 39 shows shafts used in the elevation system of the saw shown in FIG. 3.
Figure 40:
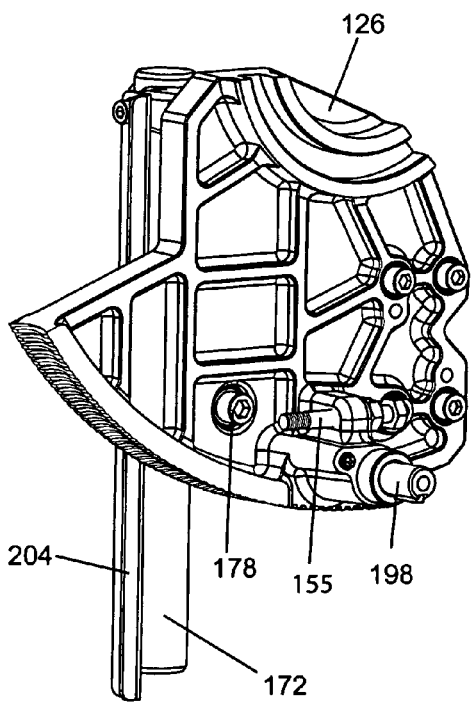
FIG. 40 is a different view of the portion of the elevation system shown in FIG. 39.
Figure 41:
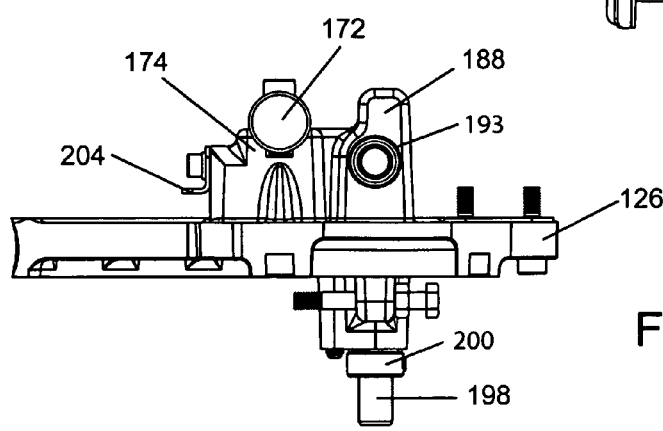
FIG. 41 is a top view of the portion of the elevation system shown in FIG. 39.
Figure 42:
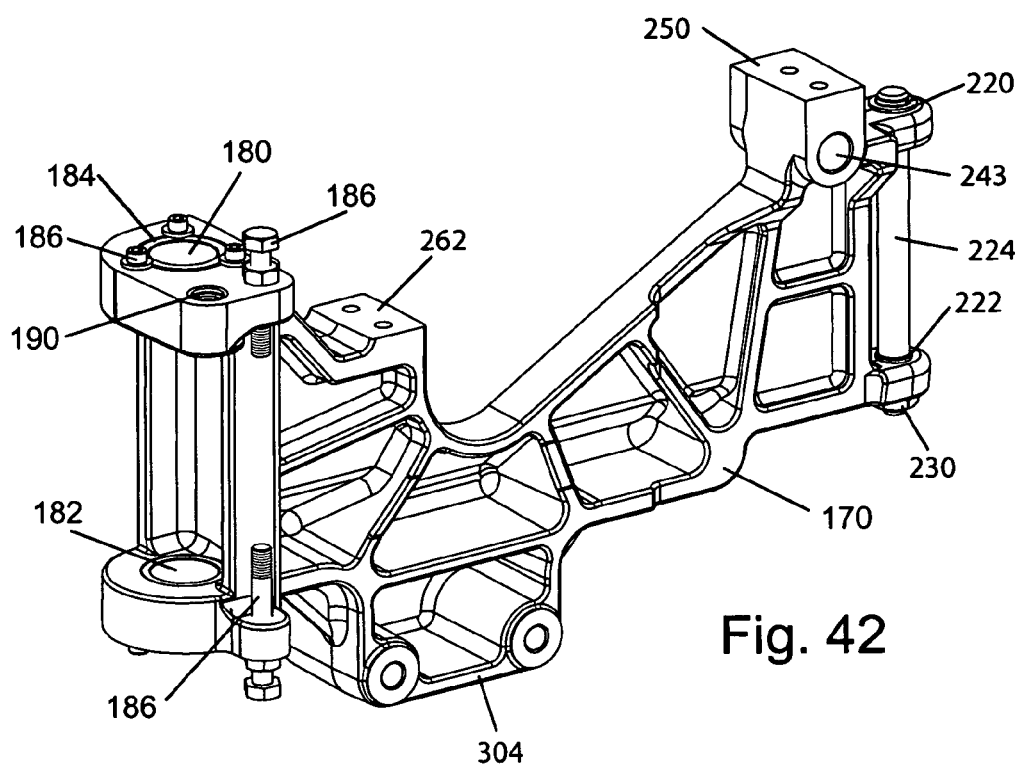
FIG. 42 is a perspective, right-side view of an elevation plate.

Elevation plate 170 includes two bores 180 and 182, labeled in FIG. 42. A bushing 184, which may be made from oil impregnated bronze, fits into each bore and is held in place by screws and washers 186. The washers overlap the edge of the bushing to prevent the bushing from moving out of the bore. A support shaft 172 fits into bores 180 and 182, as shown in FIGS. 21 through 26, and elevation plate 170 is free to slide up and down on the shaft. Shaft 172 is bolted onto front trunnion 126 to connect the elevation plate to the front trunnion. In the depicted embodiment, shaft 172 fits into two notches 174 in front trunnion 126. Bolts 176 and 178 then secure the shaft to the front trunnion, as shown in FIGS. 39 through 41. Bolt 176 extends through shaft 172 and threads into a hole in the front trunnion. Bolt 178 extends through the front trunnion and threads into shaft 172. In this manner the shaft is securely anchored to the front trunnion. Shaft 172 may be mounted to the front trunnion in other ways as well.

Figure 21:
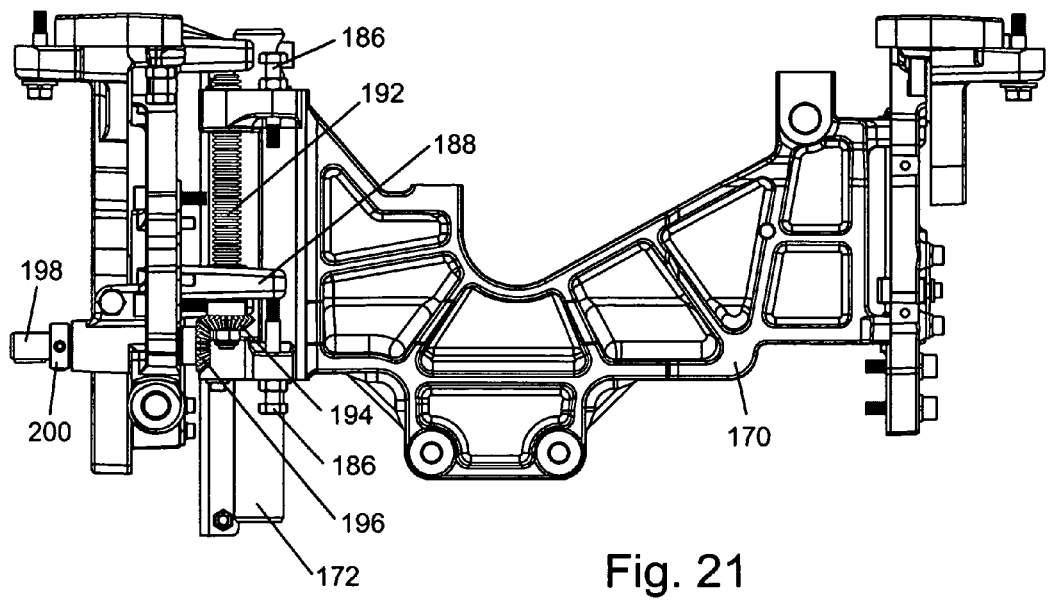
FIG. 21 shows a right-side view of an elevation plate and elevation system.
Figure 22:
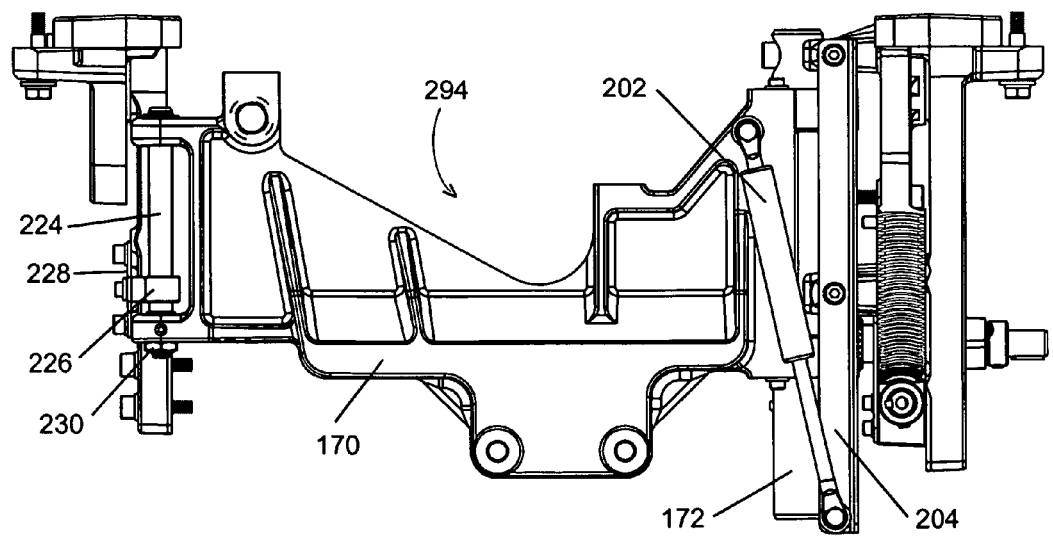
FIG. 22 shows a left-side view of an elevation plate and elevation system.
Figure 23:
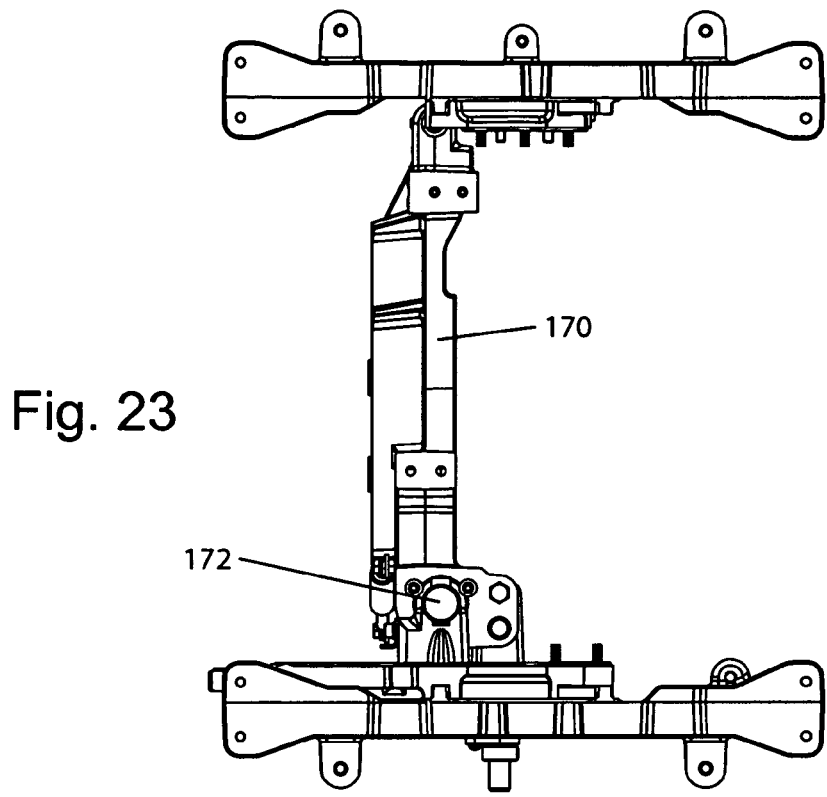
FIG. 23 shows a top view of an elevation plate and elevation system.
Figure 24:
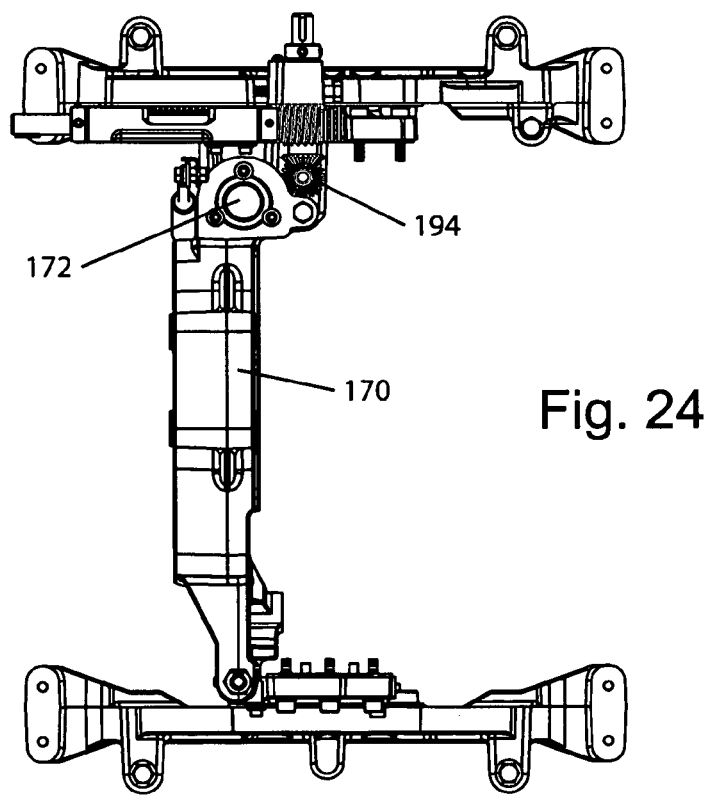
FIG. 24 shows a bottom view of an elevation plate and elevation system.

The distance elevation plate 170 may slide up and down on shaft 172 is ultimately defined by the spacing between notches 174 on front trunnion 126 and the spacing between bores 180 and 182 on the elevation plate. That distance, however, may be further defined by adjustable stops 186 shown in FIG. 42. These stops are made of bolts threaded through holes in the elevation plate and lock nuts to hold the bolts in place, as shown. The bolts are positioned so they abut a shoulder 188 extending out from the front trunnion bracket, as shown in FIG. 21. (Shoulder 188 is also shown in FIGS. 39 and 41.) The distance the elevation plate may slide up or down on shaft 172 is thus defined by how far the stops or bolts extend.

Figure 28:
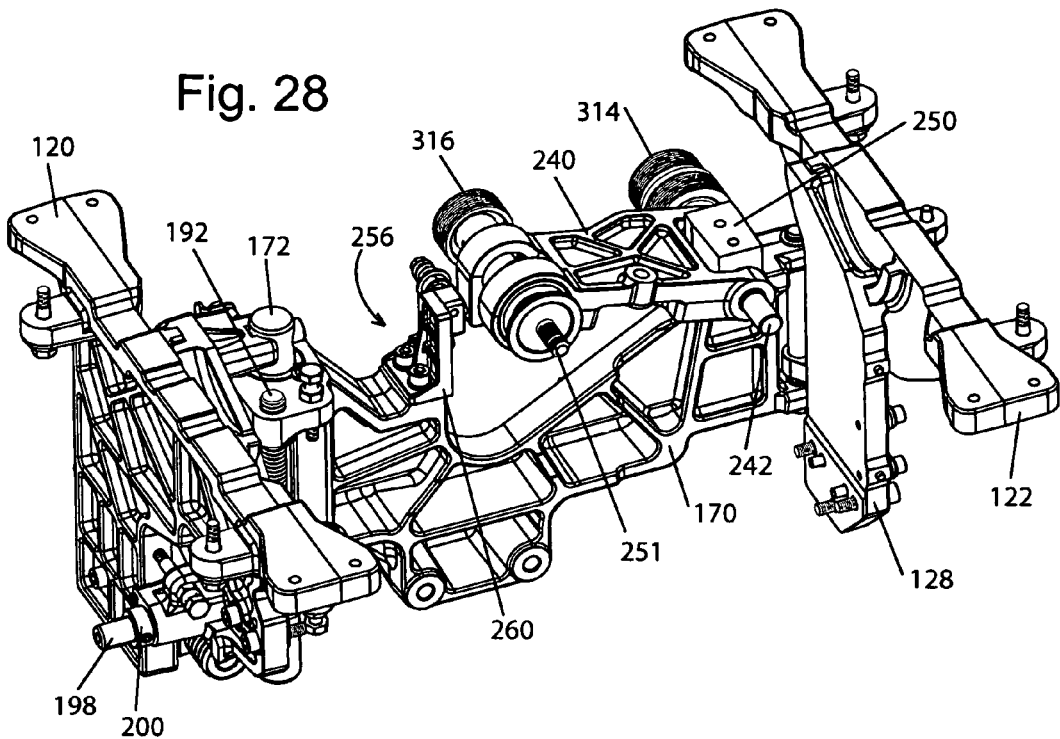
FIG. 28 is a perspective top view of part of the internal mechanism of the saw shown in FIG. 3, including an elevation plate and arbor assembly.

Elevation plate 170 also includes a threaded bore 190 configured to accept a threaded shaft 192, shown best in FIGS. 21, 28 and 39. Shaft 192 also extends through a bore 193 in shoulder 188 on the front trunnion bracket to further support the shaft (bore 193 is labeled in FIGS. 15 and 41). The threaded shaft may be held in bore 193 in any manner, such as by clips or collars. A bevel gear 194 is mounted on the end of shaft 192 below shoulder 188. A second bevel gear 196 is mounted on a shaft 198 that extends perpendicularly relative to shaft 192. Shaft 198 extends through and is supported for rotation by the front trunnion. A collar 200 holds shaft 198 in place. Shafts 192 and 198 are positioned so that the two bevel gears mesh. Shaft 198 also extends through a hole in cabinet 104 and hand wheel 110 is mounted on the shaft. When a person turns hand wheel 110, bevel gear 196 causes threaded shaft 192 to turn. When threaded shaft 192 turns, elevation plate 170 moves up or down on the shaft because hole 190 is threaded. Moving the elevation plate up and down causes the blade to move up and down relative to the tabletop. In this manner, a user may adjust the elevation of the blade.

The construction of elevation plate 170 and shafts 172 and 192 may be referred to as a vertical slide because the elevation plate slides vertically on shaft 172. Other constructions of vertical slides are also possible, such as using one or move dovetail slides instead of a shaft. Multiple vertical shafts may also be used instead of one shaft and multiple vertical shafts may be spaced apart to support the elevation plate. Shafts or dovetail slides may also be positioned at each end of the elevation plate instead of at one end only.

Additionally, a motor may be used instead of hand wheel 110 to turn the bevel gears to raise or lower the elevation plate, or a motorized lift may be used instead of the bevel gears. The motor or lift may be actuated by a typical switch or by a switch configured to be similar to a hand wheel.

Elevation plate 170, and any components attached to the elevation plate (such as a motor, as will be discussed below), may have significant weight and therefore it may be difficult to turn hand wheel 110 to raise the blade. Accordingly, the depicted embodiment includes a gas spring 202 mounted at one end to the elevation plate and at the other end to a bracket 204 mounted to the front trunnion, as shown best in FIGS. 25 and 26. The gas spring is biased to push the elevation plate up with a predetermined amount of force to make it easy for a user to turn hand wheel 110 to raise the blade. The force of the gas spring may be selected so that the elevation plate is biased up or down to take out any play or slack between threaded shaft 192 and threaded bore 190. Forces in the range of 50 to 250 pounds may be used, depending on how much weight must be lifted.

It is important that elevation plate 170 be restricted from any side-to-side motion or rotation around the longitudinal axis of support shaft 172 in order to hold the saw blade straight, and support shaft 172 and threaded shaft 192 limit how the elevation plate may move. However, in the depicted embodiment, because the elevation plate is relatively long and supported principally at one end, and also because of manufacturing tolerances in shafts 172 and 192 and their corresponding bores in the elevation plate, there is a risk that the elevation plate may move slightly in an undesired manner, especially if the elevation plate is tilted. Accordingly, elevation plate 170 includes bores 220 and 222 in two projections at the distal end of the elevation plate, opposite bores 180 and 182, and a guide shaft 224 is mounted in the bores. The guide shaft may be held in the bores by clips, bolts, or any other method.

Figure 25:
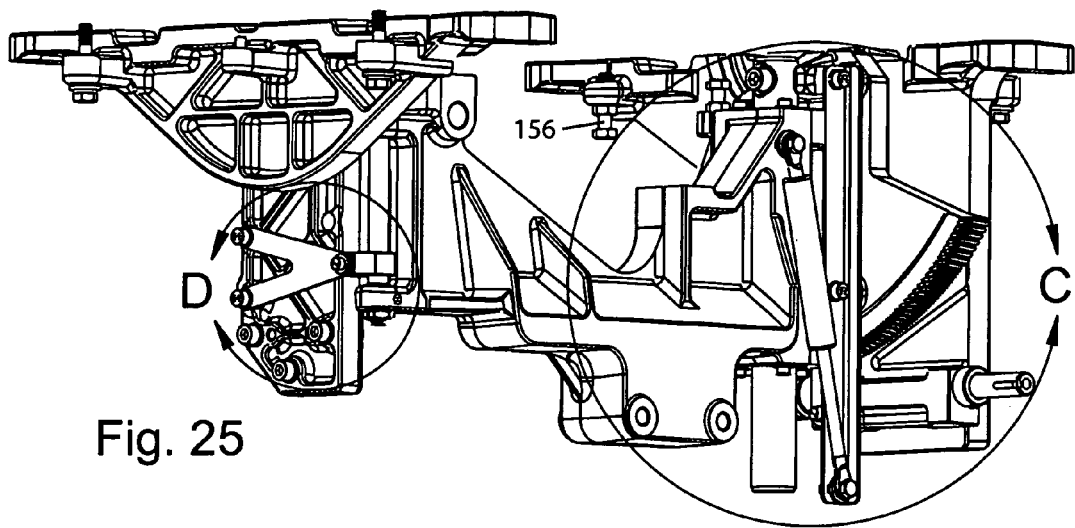
FIG. 25 shows a perspective view of an elevation plate and elevation system with portions labeled "C" and "D" designated for detail views.
Figure 26:
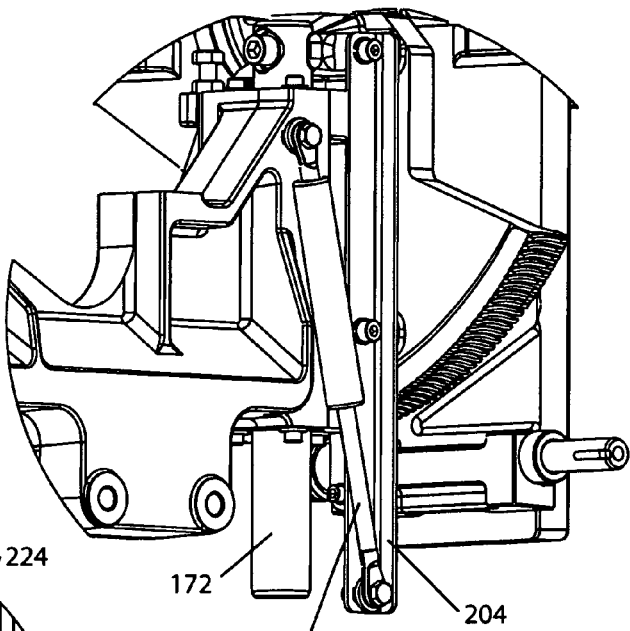
FIG. 26 is the detail view of the portion labeled "C" in FIG. 25, showing part of an elevation system.
Figure 27:
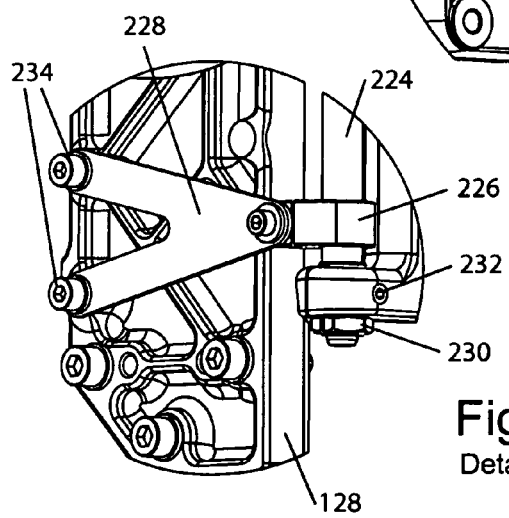
FIG. 27 is the detail view of the portion labeled "D" in FIG. 25, showing part of an elevation system.

A guide block 226 is placed on the guide shaft between bores 220 and 222 so the shaft can move up and down in the guide block. The guide block, in turn, is mounted to the apex of a V-bracket 228, and the opposite two ends of the V-bracket are bolted to the rear trunnion 128, as shown in FIGS. 25 and 27. This arrangement allows the elevation plate to move up and down to change the elevation of the blade, but prevents the distal end of the elevation plate from moving to the side or rotating around shaft 172 because the V-bracket is bolted to the rear trunnion and the guide block is mounted to the V-bracket.

This arrangement also accommodates variances or tolerances in manufacturing. Guide shaft 224 should be substantially parallel with support shaft 172 so that the elevation plate can move up and down on shaft 172 without binding on shaft 224. However, it may be difficult to make shaft 224 substantially parallel with shaft 172, especially given that the shafts are spaced a significant distance apart.

In the depicted embodiment, guide shaft 224 may be mounted in an eccentric bushing 230. Bushing 230 is similar to bushing 146 shown in FIG. 37, except it does not need shoulders 152. Bushing 230 has an off-center hole through which guide shaft 224 passes. The bushing is placed over the shaft and in bore 222 and held on the shaft by a clip. The bushing may then be turned to move the guide shaft and align the shaft as necessary. When the bushing is turned to its desired location, it is held in place by a set screw 232 shown in FIG. 27.

Guide block 226 is bolted onto the apex of V-bracket 228, as explained. A single bolt mounts the guide block to the V-bracket so the bracket can be adjusted or rotated around the bolt to align with the guide shaft so the guide shaft can slide up and down in the guide block.

The two ends of V-bracket 228 opposite the guide block are bolted to the rear trunnion by bolts 234, as stated. The V-bracket itself is made of a material which has some flex, such as metal, and there is a distance between bolts 234 and guide block 226. That distance and the flex of the material allow the V-bracket to flex out toward the rear of the saw if necessary to accommodate the guide shaft. That flex may be necessary if the distance of shaft 224 from shaft 172, the position of shaft 172 or shaft 224 in the saw, or the dimension of other components in the saw varies due to manufacturing tolerances or other reasons. That flex also may be necessary to accommodate the expanding or contracting of the elevation plate due to temperature changes. Thus, the ability of the V-bracket to flex out helps prevent the guide shaft from binding in guide block 226.

This mounting configuration may be thought of as constraining only one degree of freedom of the guide shaft; specifically, it constrains any side-to-side movement of the guide shaft. The mounting configuration allows the guide shaft and elevation plate to move up and down and front-to-back. This mounting configuration accommodates some misalignment of the guide shaft.

Figure 29:
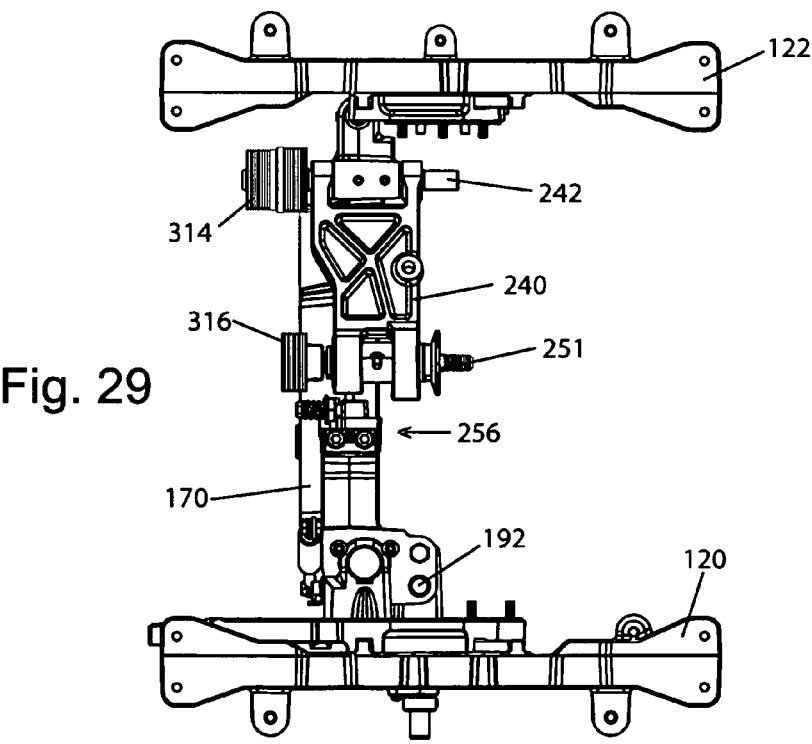
FIG. 29 is a bottom view of the components shown in FIG. 28.
Figure 32:
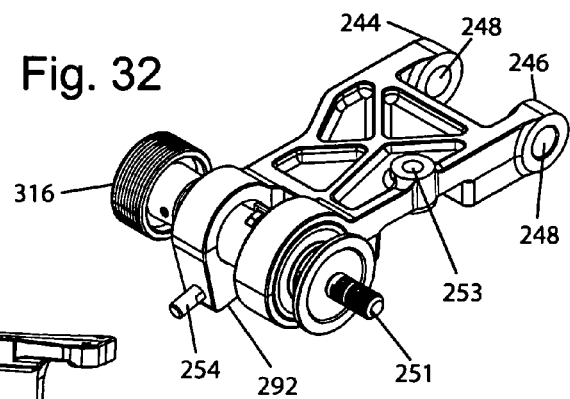
FIG. 32 shows an arbor block and arbor used in the saw shown in FIG. 3.
Figure 33:
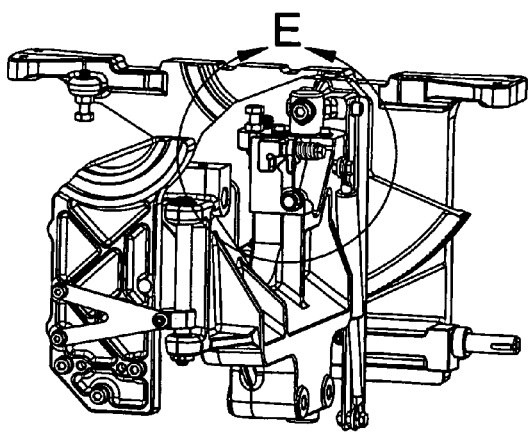
FIG. 33 shows a portion of the internal mechanism of the saw shown in FIG. 3, with a portion labeled "E" designated for a detail view.
Figure 34:
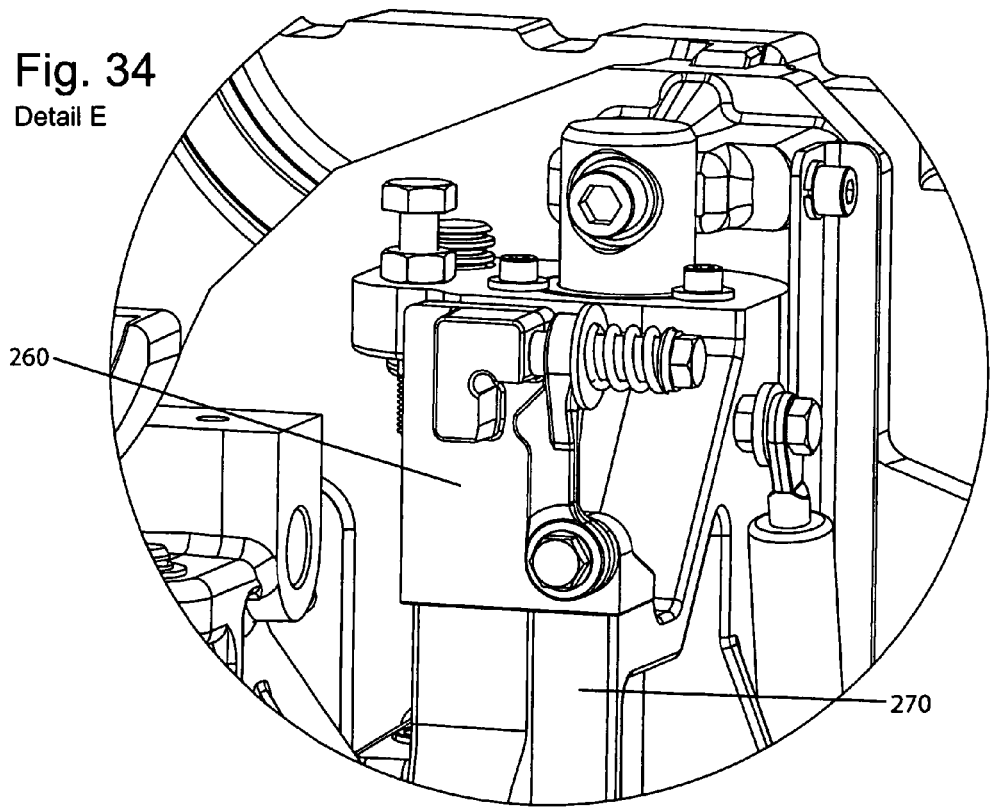
FIG. 34 is the detail view of the portion labeled "E" in FIG. 33, showing an arbor block support mechanism.
Figure 35:
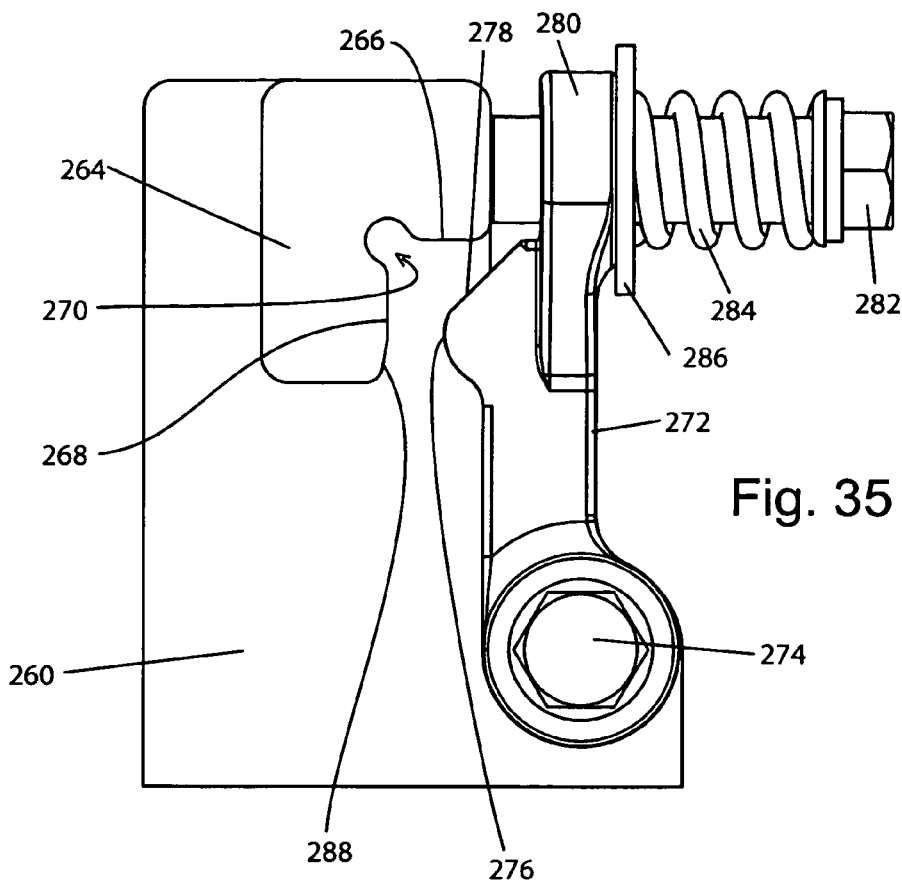
FIG. 35 shows an arbor block support mechanism.
Figure 36:
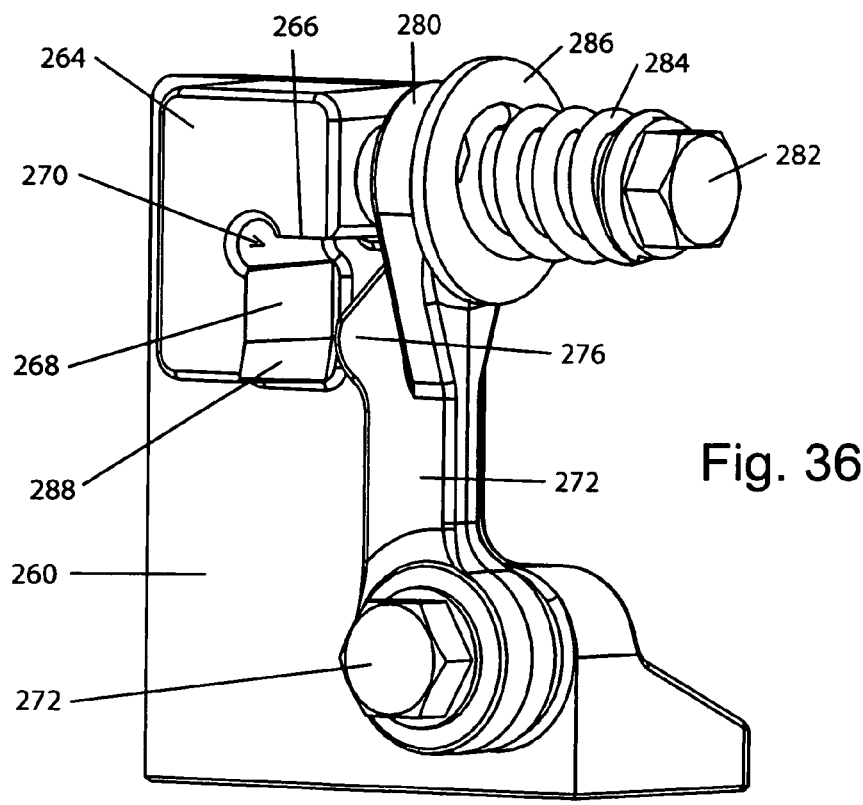
FIG. 36 also shows an arbor block support mechanism.
Figure 43:
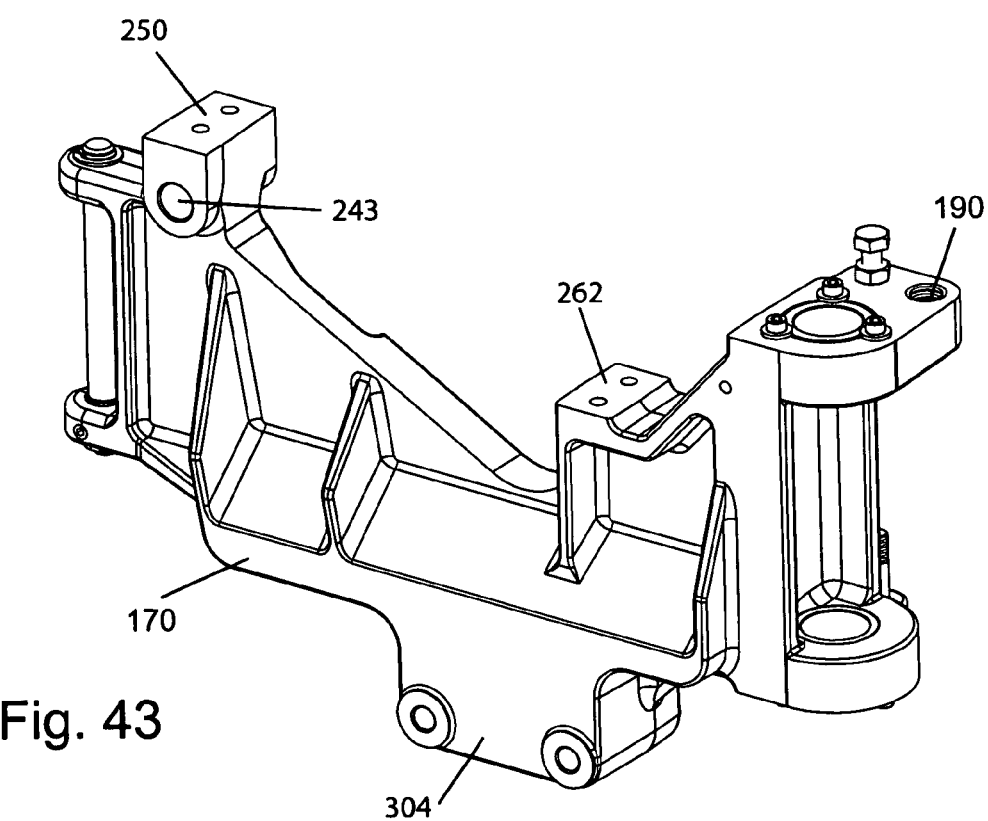
FIG. 43 is a perspective, left-side view of the elevation plate shown in FIG. 42.

An arbor block 240 is pivotally mounted to the elevation plate as shown in FIGS. 28 and 29. The arbor block includes two projections 244 and 246, each projection having a bore 248, as shown in FIG. 32. The elevation plate includes a raised portion 250 and bore 243 extends through that raised portion, as shown in FIG. 43. Projections 244 and 246 on the arbor block sandwich raised portion 250, and a shaft 242 then passes through bores 248 in the arbor block and bore 243 in the elevation plate to mount the arbor block to the elevation plate. Arbor block 240 may then pivot up and down around shaft 242.

An arbor 251 is mounted for rotation in arbor block 240, as shown in FIGS. 28 and 32, and the blade of the saw is mounted on the arbor so that it spins when the arbor rotates. The arbor is held in two bearings that are mounted in bearing seats in the arbor block. The bearings are isolated electrically from the arbor block by plastic overmolding on the arbor or by insulating bushings. Electrodes are positioned adjacent but not touching the arbor to impart the electrical signal to the blade used in the detection subsystem discussed above. The configuration of the arbor and electrodes are disclosed in detail in U.S. Provisional Patent Application Ser. No. 60/496, 550, entitled "Table Saws with Safety Systems and Blade Retraction," filed Aug. 20, 2003, the disclosure of which is hereby incorporated by reference.

Figure 30:
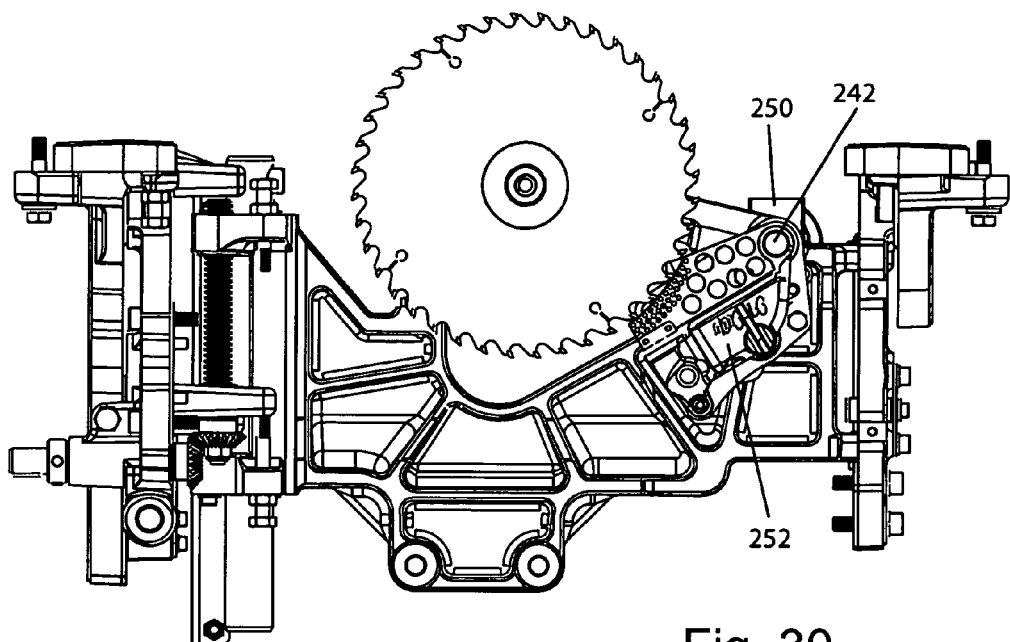
FIG. 30 is a right-side view of part of the internal mechanism of the saw shown in FIG. 3, including an elevation plate, arbor assembly, brake cartridge and blade.

Shaft 242 extends outwardly from the right side of the arbor block a sufficient distance so that a brake cartridge 252 may be pivotally mounted on the shaft, as shown in FIG. 30. The brake cartridge is sized and positioned so that it is adjacent the perimeter of a blade having a specified nominal diameter. The brake cartridge includes a pawl, and the pawl pivots toward the blade around shaft 242 to stop the blade from spinning when the detection subsystem detects that a person has contacted the blade, as described above. The brake cartridge may be constructed and mounted in the saw in many ways. Examples of how the brake cartridge may be constructed and mounted in a saw are disclosed in U.S. Provisional Patent Application Ser. No. 60/496,574, entitled "Brake Cartridges for Power Equipment," filed Aug. 20, 2003, and U.S. Provisional Patent Application Ser. No. 60/533,575, entitled "Brake Cartridges and Mounting Systems for Brake Cartridges," the disclosures of which are hereby incorporated by reference. That provisional patent application also discloses how the position of the brake cartridge relative to the perimeter of the blade may be adjusted by a linkage between the arbor block and the mounting structure for the brake cartridge. Arbor block 240 includes an aperture 253 through which a bolt may extend to adjust the spacing between the brake cartridge and the blade.

Brake cartridge 252 also acts as a mechanism to prevent a user of the saw from installing a blade larger than recommended. The brake cartridge physically blocks a large blade from being mounted on the arbor because the blade bumps into the brake cartridge.

Arbor 252 includes a pin 254 (labeled in FIG. 32) that engages an arbor block support mechanism 256 to hold the arbor block up and prevent the arbor block from pivoting around shaft 242 during normal operation of the saw. Pin 254 and arbor block support mechanism 256 also provide rigidity to the arbor block and minimize any vibration of the arbor block during normal operation of the saw. However, when a person accidentally contacts the blade the brake cartridge will engage and stop the blade. The angular momentum of the blade as it is stopped will create a significant downward force and that force will cause pin 254 to disengage from the arbor block support mechanism. When the pin has disengaged, the arbor block will be free to pivot around shaft 242, so the downward force resulting from stopping the blade will cause the arbor block to pivot down very quickly. The blade will also pivot down because the blade is supported by the arbor block. In this manner, the blade will retract below the tabletop of the saw when a person accidentally contacts the blade.

The arbor block support mechanism is shown in detail in FIGS. 28 and 33 through 36. An L-shaped bracket 260 is bolted onto surface 262 on the elevation plate (surface 262 is labeled in FIG. 43). The L-shaped bracket includes a projection 264 having a first surface 266 and a second surface 268. The first and second surfaces define a corner region 270 into which pin 254 would normally nest. Material from projection 264 may be removed in the corner region to allow pin 254 to contact first and second surfaces 266 and 268 at points that are somewhat distant from each other to better hold the pin. A small pivot arm 272 is mounted on L-bracket 260 so that the pivot arm may pivot around a bolt 274. The pivot arm includes a tab 276 having a support surface 278. Support surface 278 also abuts against pin 254 to help hold the pin in place during normal operation of the saw. Pivot arm 272 also includes a distal end 280 shaped to include an aperture through which a shoulder bolt 282 may pass. The shoulder bolt passes through distal end 280 and threads into projection 264 in the L-shaped bracket. A spring 284 and washer 286 are positioned between the head of bolt 282 and distal end 280 of the pivot arm. The spring is sized to bias the pivot arm toward projection 264. Thus, pin 254 is held in corner 270 by spring 284 pushing pivot arm 272 against the pin. Threading bolt 282 into or out of projection 264 will adjust the force exerted by spring 284 against pin 0.254.

When brake cartridge 252 stops the blade, the downward force caused by the angular momentum of the blade will overcome the force of spring 284, and pin 254 will then push pivot arm 272 aside and move down. Projection 264 includes a third surface 288 that connects with but slopes away from second surface 268. Third surface 288 slopes away in order to provide clearance for pin 254 to move down. As soon as pin 254 moves down past the point where the third and second surfaces connect, the pin no longer contacts projection 264 so it is free to move down. Similarly, tab 276 on pivot arm 272 is rounded to quickly release pin 254 when the pin begins to move down. The intersection of second surface 268 with third surfaces 288 is positioned substantially opposite the tangent point of the rounded tab 276 so that pin 254 is released from both projection 264 and tab 276 substantially simultaneously.

Figure 14:
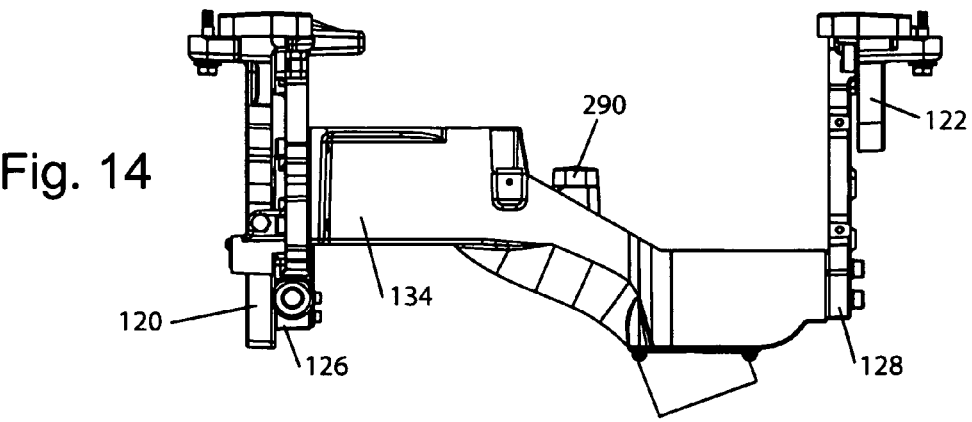
FIG. 14 shows a right-side view of a trunnion brace used in the saw shown in FIG. 3.
Figure 31:
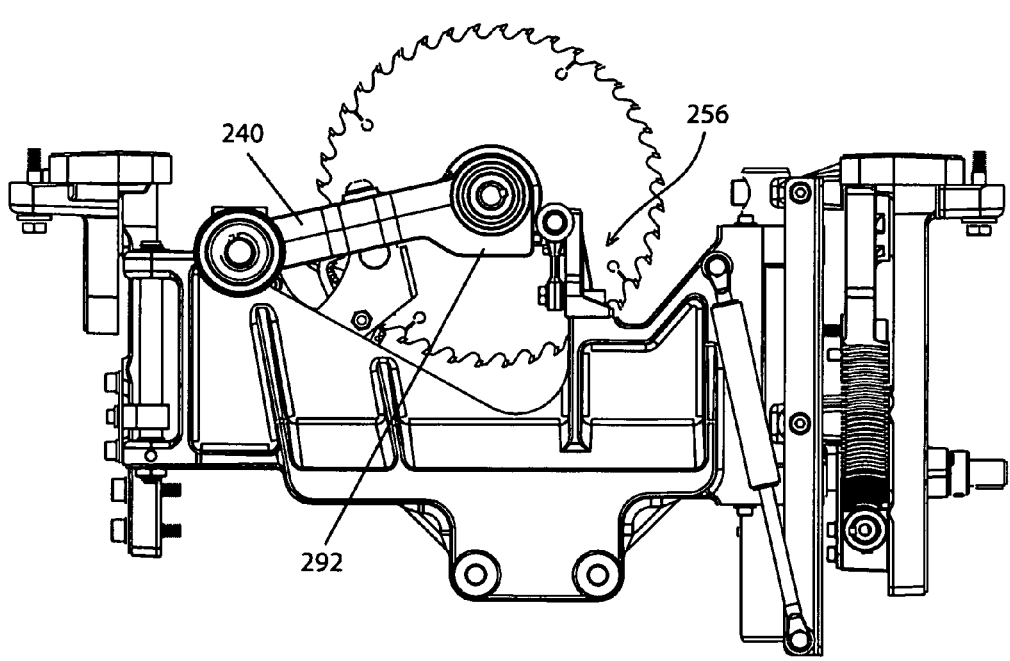
FIG. 31 is a left-side view of part of the internal mechanism of the saw shown in FIG. 3, including an elevation plate, arbor assembly, brake cartridge, blade and arbor block support mechanism.

A bumper or pad 290 is mounted on trunnion brace 134 below arbor block 240, as shown in FIGS. 5 and 14. When the arbor block retracts, bumper 290 stops the downward motion of the arbor block and helps absorb the energy of the retraction. The arbor block includes a surface 292 configured to contact bumper 290, as shown in FIGS. 31 and 32.

The energy of retraction may be significant. Accordingly, bumper 290 may be selected from materials that have good dampening characteristics and arbor block 240 may be made from a ductile iron so that the arbor block it is less likely to be damaged during retraction. Additionally, trunnion brace 134 should be constructed so that it is sufficiently strong to support bumper 290 and withstand the force of impact with the arbor block.

Figure 16:
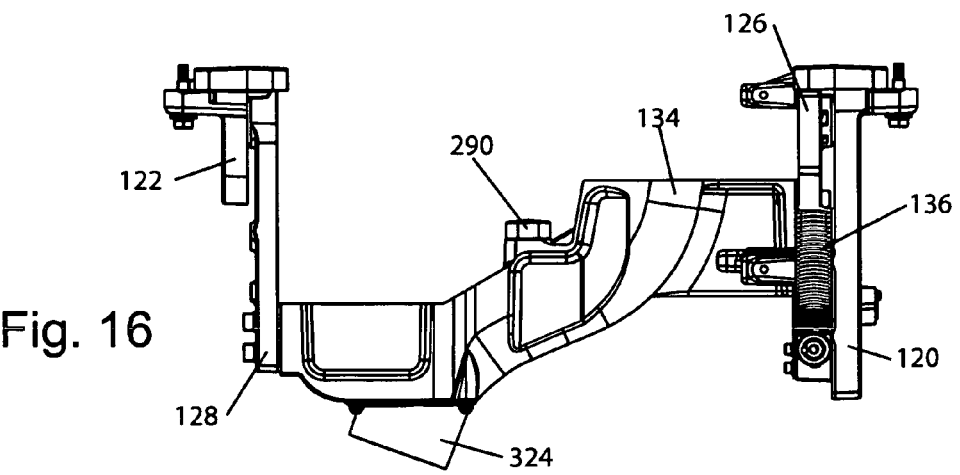
FIG. 16 shows a left-side view of a trunnion brace used in the saw shown in FIG. 3.
Figure 17:
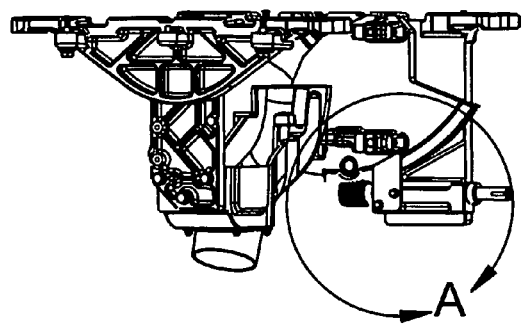
FIG. 17 shows part of the internal mechanism of the saw with a portion labeled "A" designated for a detailed view.

Trunnion brace 134 and elevation plate 170 are both construction to provide clearance for the arbor block and blade to retract in case of an accident. As shown in FIGS. 14 and 16, the trunnion brace sweeps down from front trunnion 126 to rear trunnion 128 so that the bottom of the blade will not contact the trunnion brace when the blade is fully retracted. Elevation plate 170 also includes a recessed area 294 (labeled in FIG. 22) that allows the arbor block to pivot down.

Figure 10:
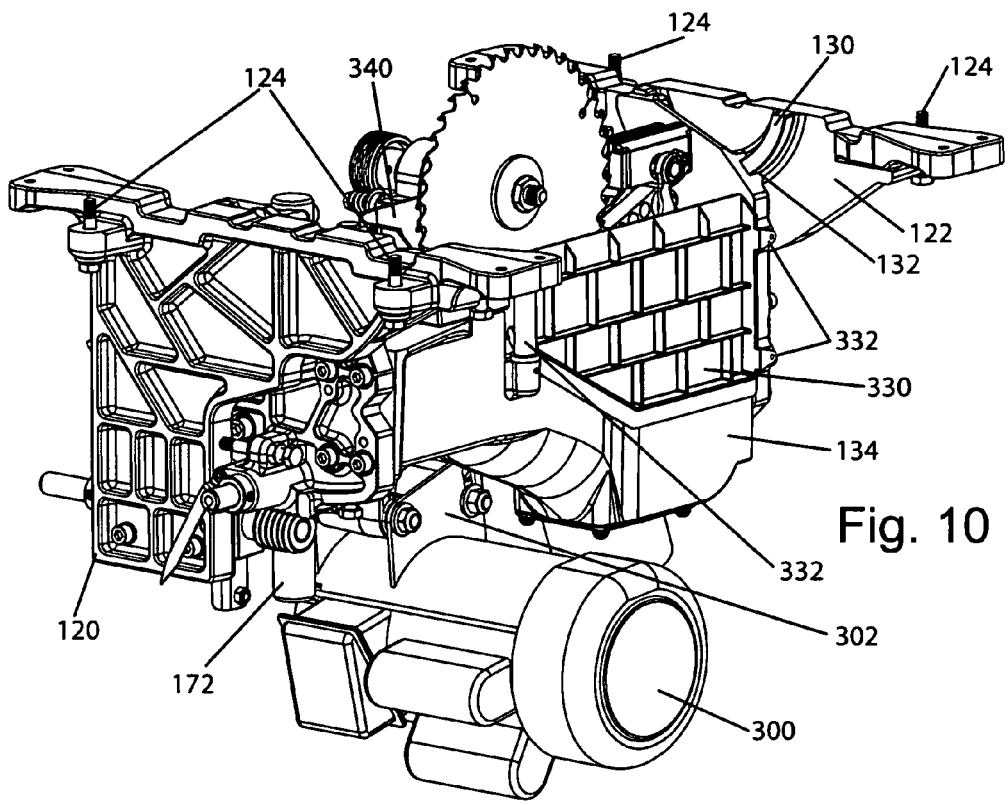
FIG. 10 shows a front-right perspective view of the internal mechanism of the saw with the table removed.
Figure 11:
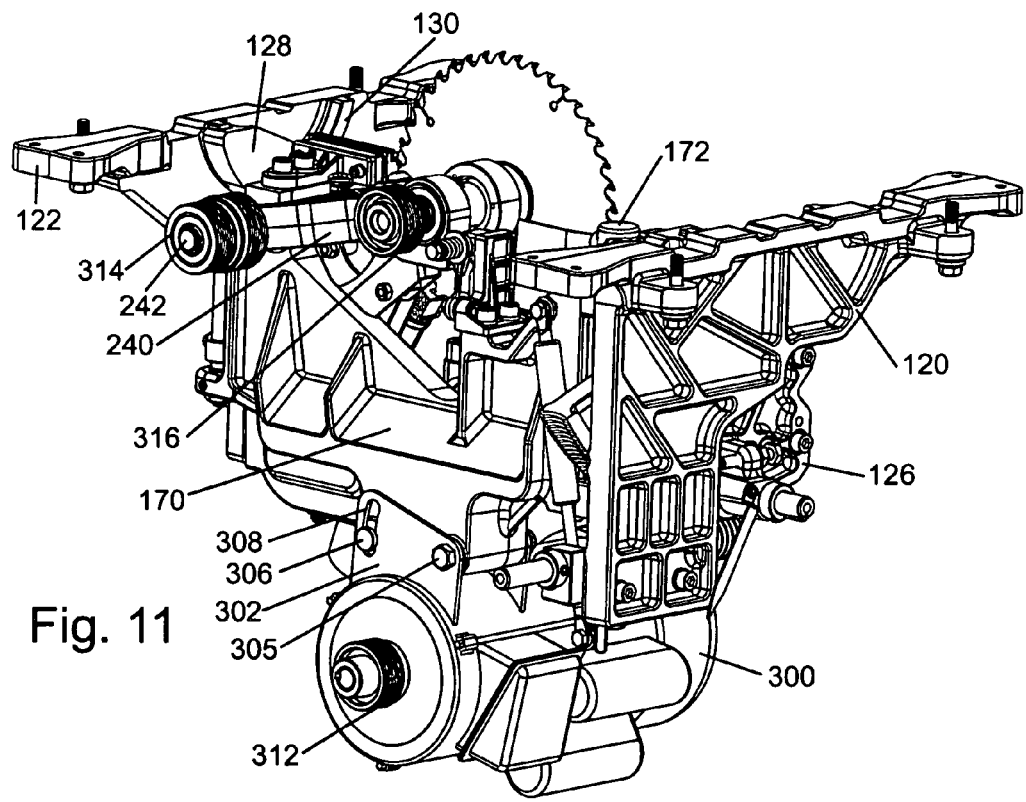
FIG. 11 shows a front-left perspective view of the internal mechanism of the saw with the table removed.
Figure 12:
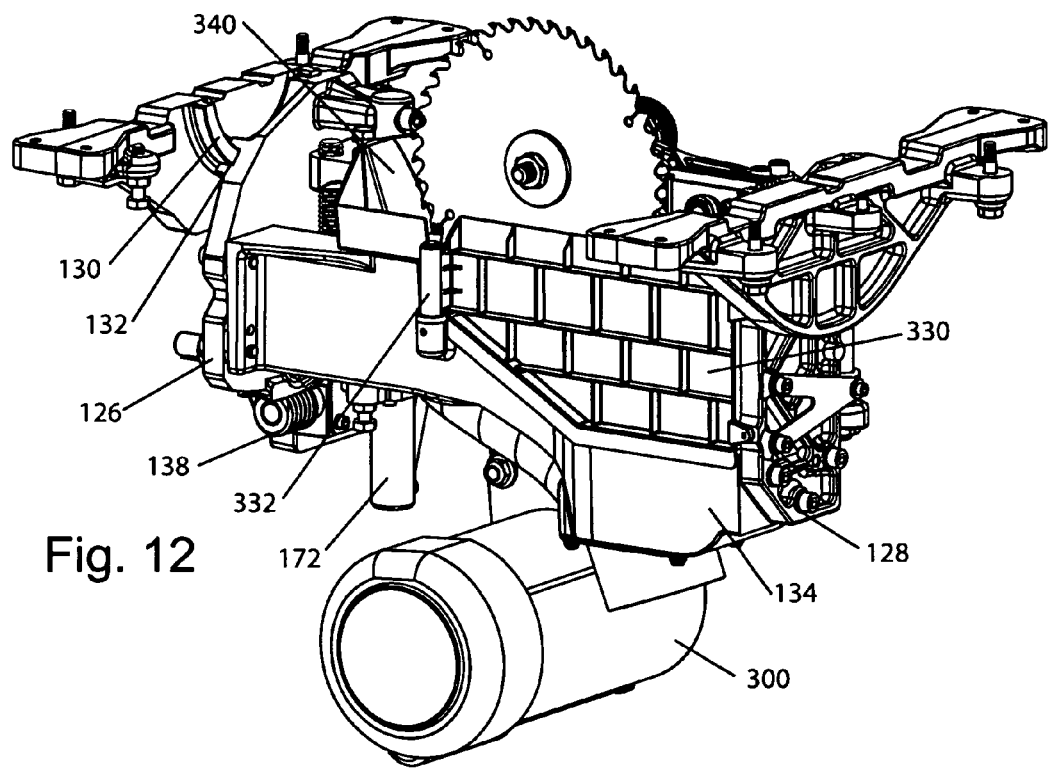
FIG. 12 shows a back-right perspective view of the internal mechanism of the saw.

Saw 100 is powered by a motor 300 mounted to the bottom of elevation plate 170. The motor may be mounted to the elevation plate in many ways. In the depicted embodiment, tabs 302 projects up from the motor and sandwich a projection 304 on the bottom of the elevation plate (projection 304 is labeled in FIGS. 42 and 43). Bolts 305 and 306 pass through holes in the tabs and projection to mount the motor to the elevation plate, as shown in FIGS. 10 and 11.

A drive shaft 310 extends from the motor and a pulley 312 is mounted on the drive shaft. A double pulley 314 is mounted on the left end of shaft 242 so that a first belt (not shown) may extend around the motor pulley and the outside of the double pulley. A third pulley 316 is mounted on the left end of arbor 251 and a second belt (not shown) extends around pulley 316 and the inside of double pulley 314. Motor 300 turns pulley 312, which then turns double pulley 314 and arbor pulley 316, causing the blade mounted on the arbor to spin. The depicted embodiment includes a double belt system as described so that arbor block 240 may retract by pivoting down around shaft 242 without disengaging from the drive belts.

Pulleys 314 and 316 are fixed-center pulleys, so a slightly stretchy Poly-V belt designed for fixed center pulleys is used. A slightly stretchy belt also has the advantage of being able to stretch and slip on pulley 316 when the brake cartridge stops the blade. This is advantageous because pulley 316 will stop very suddenly when the brake cartridge stops the blade, but the motor and belts will continue spinning for a short period of time. A stretchy belt will be able to stretch and slip on pulley 316 when the pulley stops suddenly. Of course, other belt and pulley configurations and belt tensioning systems may be used.

The belt around pulley 316 is preferably made of a static dissipative material so that static charge does not build up on the arbor or blade. This is advantageous because in some implementations a static charge may interfere with the detection subsystem. A standard belt or a slightly stretchy belt may extend around motor pulley 312 and the outside of double pulley 314. The pulleys may be sized so that the blade spins at a desired speed, such as 4000 rpm, while the motor spins at a different speed, such as 3450 rpm.

The belt extending around the motor pulley and the outside of double pulley 314 may be tensioned by moving the motor out. In the depicted embodiment, motor 300 is mounted to the elevation plate so that it may pivot around bolt 305. Tabs 302 include an oversized hole 308 through which bolt 306 passes so that the motor may pivot around bolt 305. To put tension on the belt, bolt 306 is loosened and the motor is pivoted around bolt 305 away from the double pulley. When the desired tension is achieved, bolt 306 is tightened to hold the motor in position.

Trunnion brace 134 is shaped to partially shroud the blade under table 102. Shrouding the blade prevents a person from contacting the blade under the table. This is useful because if a person contacts the blade under the table, the brake cartridge will fire and the blade will retract, possibly into the person's hand. Shrouding the blade also helps to collect sawdust created when the saw is running.

Figure 15:
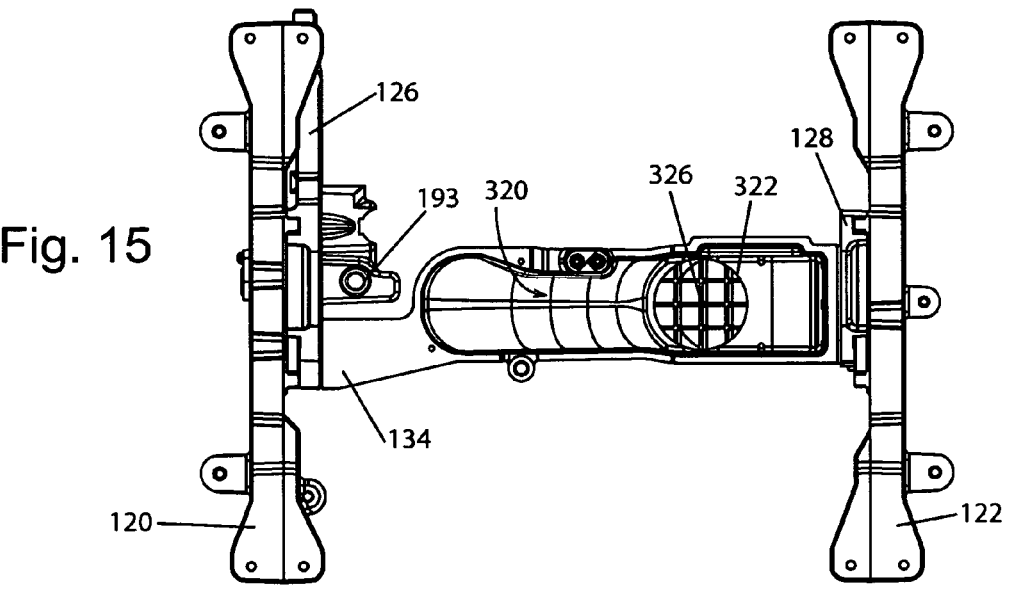
FIG. 15 shows a top view of a trunnion brace used in the saw shown in FIG. 3.

Trunnion brace 134 is shaped to create a trough or channel 320, shown in FIG. 15. The trough is wide enough to shroud the blade and to allow a person to reach into the saw through opening 106 in the tabletop to change either the blade or brake cartridge. Trough 320 is sloped down, as shown in FIGS. 14 and 16, to direct sawdust toward a port 322 in the bottom of the trough. Preferably, the inside surface of the trough, including the bottom and side walls, is as smooth as possible to avoid trapping sawdust. A hose coupling 324 is mounted to the bottom of the trunnion brace over port 322. The coupling includes a mesh 326 sized to prevent the bolt and washer with which the blade is secured to the arbor from falling through the mesh. It is possible when a user changes the blade that the blade nut or washer could fall into the saw and become difficult to retrieve. Mesh 326 prevents the bolt or washer from falling where they would be difficult to retrieve. A flexible vacuum hose or other conduit (not shown) is connected to the bottom of the coupling and extends to a similar port on the back of the saw. Thus, sawdust is collected by the blade shroud and then directed out through port 322 and through a conduit to the back of the saw. A user may connect a vacuum system to the port on the back of the saw to collect the sawdust and to create an airflow from the blade shroud to the back of the saw. The hose or conduit between coupling 324 and the port on the back of the saw is flexible so it can move when the trunnion brace tilts.

A side blade shroud 330, shown in FIGS. 4, 8, 10 and 12, is mounted on trunnion brace 134 to the right of the blade. This shroud further encloses the blade to prevent inadvertent contact with the blade and to collect sawdust. Side shroud 330 is mounted to the trunnion brace by a vertical hinge 332. The vertical hinge allows the side shroud to pivot out, away from the blade, around the vertical axis of the hinge. Pivoting the side blade shroud out provides additional room to change the blade or brake cartridge. The additional room is especially necessary to slide brake cartridge off of shaft 242. The side shroud includes magnets 332 to engage the rear trunnion and hold the side shroud closed, although other mechanisms may be used to hold the side shroud closed. The top of the side shroud is shaped and positioned sufficiently away from the underside of the tabletop so that the blade can tilt to the left without the side shroud bumping into the underside of the table.

A front shroud 340 is also mounted on the trunnion brace to the front of the blade. This shroud further helps enclose the blade and direct sawdust to the port in the bottom of the trunnion brace. The right side of this shroud is shorter than the left side in order to allow the blade and trunnion brace to tilt to the left. This shroud would typically be made of a lightweight material to reduce the weight of the saw. Alternatively, the trunnion brace itself may be designed to extend up and form the front blade shroud.

The underside of table 102 may include recesses to allow the blade to raise to a predetermined height without the arbor block bumping into the underside of the table.

The cabinet of the table saw may include in opening to allow access to the internal mechanism of the saw. FIG. 1 shows saw 100 with a cover 342 over such an opening. The cover is mounted to the cabinet with hinges so it can pivot open. A standard latch is used to keep the cover closed. The cover may include louvers to allow airflow into the cabinet.

Saw 100 may also include a switch box 344 with one or more switches to control the operation of the saw. A switch box designed for use with safety systems as described above is described in detail in U.S. Provisional Patent Application Ser. No. 60/533,598, entitled "Switch Box for Power Tools with Safety Systems," the disclosure of which is hereby incorporated by reference.

Saw 100 may also come with a fence 346 that rests on table 102 and clamps to a front rail. The fence provides a face against which a user may slide a work piece when making a cut. The saw may also come with a miter gauge 348 and a blade wrench 350. One possible fence is disclosed in U.S. Provisional Patent Application Ser. No. 60/533,852, entitled "Improved Fence for Table Saws," the disclosure of which is hereby incorporated by reference.

Saw 100 may also include a riving knife positioned adjacent the back edge of the blade. The riving knife may be mounted in the saw on raised portion 250 of elevation plate 170. Mounting the riving knife on that raised portion allows the riving knife to move up and down and tilt with the blade.

Guard 108 also may mount on raised portion 250, and may include a splitter and anti-kickback pawls. Guard 108 can also be mounted in the saw in other ways.

INDUSTRIAL APPLICABILITY

The systems, mechanisms and components disclosed herein are applicable to power equipment, and particularly to table saws that include safety systems to detect human contact with the blade.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:

a table defining a work surface;

a nominally planar, circular blade configured to extend at least partially above the work surface to cut a workpiece on the work surface;
a motor to drive the blade;
an elevation mechanism configured to position the blade at various elevations relative to the work surface;
a tilt mechanism configured to lilt the blade at various angles relative to the work surface around a tilt axis; and
an adjustment system configured to adjust the parallelism between the tilt axis and the plane of the blade.

2. The table saw of claim 1, where the elevation mechanism includes a vertical slide.

3. A table saw comprising:
a table defining a work surface;
a nominally planar, circular blade configured to extend at least partially above the work surface to cut a workpiece on the work surface;
a motor to drive the blade;
an elevation mechanism configured to position the blade at various elevations relative to the work surface, where the elevation mechanism includes a vertical slide;
a tilt mechanism configured to tilt the blade at various angles relative to the work surface around a tilt axis; end
an adjustment system configured to adjust the parallelism between the tilt axis and the plane of the blade;
where the vertical slide includes two spaced apart shafts, and where the adjustment system includes a mechanism to adjust the parallelism of the two shafts.

4. The table saw of claim 3, where the mechanism to adjust the parallelism of the two shafts includes an eccentric bushing.

5. The table saw of claim 3, where the mechanism to adjust the parallelism of the two shafts includes a bracket to constrain only one degree of freedom of one of the two shafts.

6. The table saw of claim 5, where the bracket constrains side-to-side movement of one of the two shafts.

7. The table saw of claim 5, where the bracket is substantially V-shaped.

8. A table saw comprising:
a table defining a work surface;
a nominally planar, circular blade configured to extend at least partially above the work surface to cut a workpiece on the work surface;
a motor to drive the blade;
an elevation mechanism configured to position the blade at various elevations relative to the work surface;
a tilt mechanism configured to tilt the blade at various angles relative to the work surface around a tilt axis; and
alignment means for adjusting the position of the blade relative to the tilt axis.

9. A table saw comprising:
a table defining a work surface;
a nominally planar, circular blade configured to extend at least partially above the work surface to cut a workpiece on the work surface;
a motor to drive the blade;
an elevation mechanism configured to position the blade at various elevations relative to the work surface, where the elevation mechanism includes two spaced apart shafts; and
an adjustment mechanism configured to adjust the parallelism of the two shafts.

10. The table saw of claim 9, where the adjustment mechanism includes an eccentric bushing.

11. The table saw of claim 9, where the adjustment mechanism includes a bracket to constrain only one degree of freedom of one of the two shafts.

12. The table saw of claim 11, where the bracket constrains side-to-side movement of one of the two shafts.

13. The table saw of claim 11, where the bracket is substantially V-shaped.

* * * * *